(12) United States Patent
Araki et al.

(10) Patent No.: US 12,361,234 B2
(45) Date of Patent: Jul. 15, 2025

(54) TOILET DEVICE, TOILET SYSTEM, METHOD FOR SETTING REMOTE OPERATION, AND NON-TRANSITORY COMPUTER-READABLE STORAGE MEDIUM

(71) Applicant: TOTO LTD., Kitakyushu (JP)

(72) Inventors: Shimpei Araki, Kitakyushu (JP); Sachiko Niwano, Kitakyushu (JP)

(73) Assignee: TOTO LTD., Fukuoka (JP)

( * ) Notice: Subject to any disclaimer, the term of this patent is extended or adjusted under 35 U.S.C. 154(b) by 0 days.

(21) Appl. No.: 18/596,797

(22) Filed: Mar. 6, 2024

(65) Prior Publication Data

US 2024/0330617 A1  Oct. 3, 2024

(30) Foreign Application Priority Data

Mar. 27, 2023  (JP) ................. 2023-050581

(51) Int. Cl.
*G06K 7/10* (2006.01)
*G06K 7/14* (2006.01)

(52) U.S. Cl.
CPC ....... *G06K 7/10297* (2013.01); *G06K 7/1417* (2013.01)

(58) Field of Classification Search
CPC .................. G06K 7/10297; G06K 7/1417
See application file for complete search history.

(56) References Cited

U.S. PATENT DOCUMENTS

| 2020/0392710 A1 | 12/2020 | Saruta et al. |
| 2023/0060626 A1 | 3/2023 | Stevens et al. |

FOREIGN PATENT DOCUMENTS

| JP | 5889461 B2 | | 3/2016 |
| JP | 2021067016 A | * | 4/2021 |
| JP | 2023-032788 A | | 3/2023 |
| TW | 202248513 A | | 12/2022 |

* cited by examiner

*Primary Examiner* — Laura A Gudorf
(74) *Attorney, Agent, or Firm* — MCDONALD HOPKINS LLC

(57) ABSTRACT

A toilet device includes a wireless communication part and a controller. The wireless communication part is configured to communicate with a personal digital assistant. The controller is configured to control the wireless communication part. The wireless communication part includes a first identification information that is unique and a second identification information that is modifiable. The controller stores the second identification information when it receives a write signal of the second identification information transmitted from the personal digital assistant.

9 Claims, 12 Drawing Sheets

TOILET DEVICE, TOILET SYSTEM, METHOD FOR SETTING REMOTE OPERATION, AND NON-TRANSITORY COMPUTER-READABLE STORAGE MEDIUM

CROSS-REFERENCE TO RELATED APPLICATIONS

This application is based upon and claims the benefit of priority from Japanese Patent Application No. 2023-050581, filed on Mar. 27, 2023; the entire contents of which are incorporated herein by reference.

FIELD

Embodiments described herein relate generally to a toilet device, a toilet system, a method for setting remote operation, and a non-transitory computer-readable storage medium.

BACKGROUND

It is known in the art that a personal digital assistant such as a smartphone or the like can be used to perform a remote operation of a functional unit of a toilet device (Japanese Patent No. 5889461).

In Japanese Patent No. 5889461, only specific personal digital assistants can communicate with a warm-water washing toilet seat, which may make the toilet seat less convenient to use.

SUMMARY

According to the embodiment, a toilet device includes a wireless communication part and a controller. The wireless communication part is configured to communicate with a personal digital assistant. The controller is configured to control the wireless communication part. The wireless communication part includes a first identification information that is unique and a second identification information that is modifiable. The controller stores the second identification information when it receives a write signal of the second identification information transmitted from the personal digital assistant.

DETAILED DESCRIPTION

Figure 1:
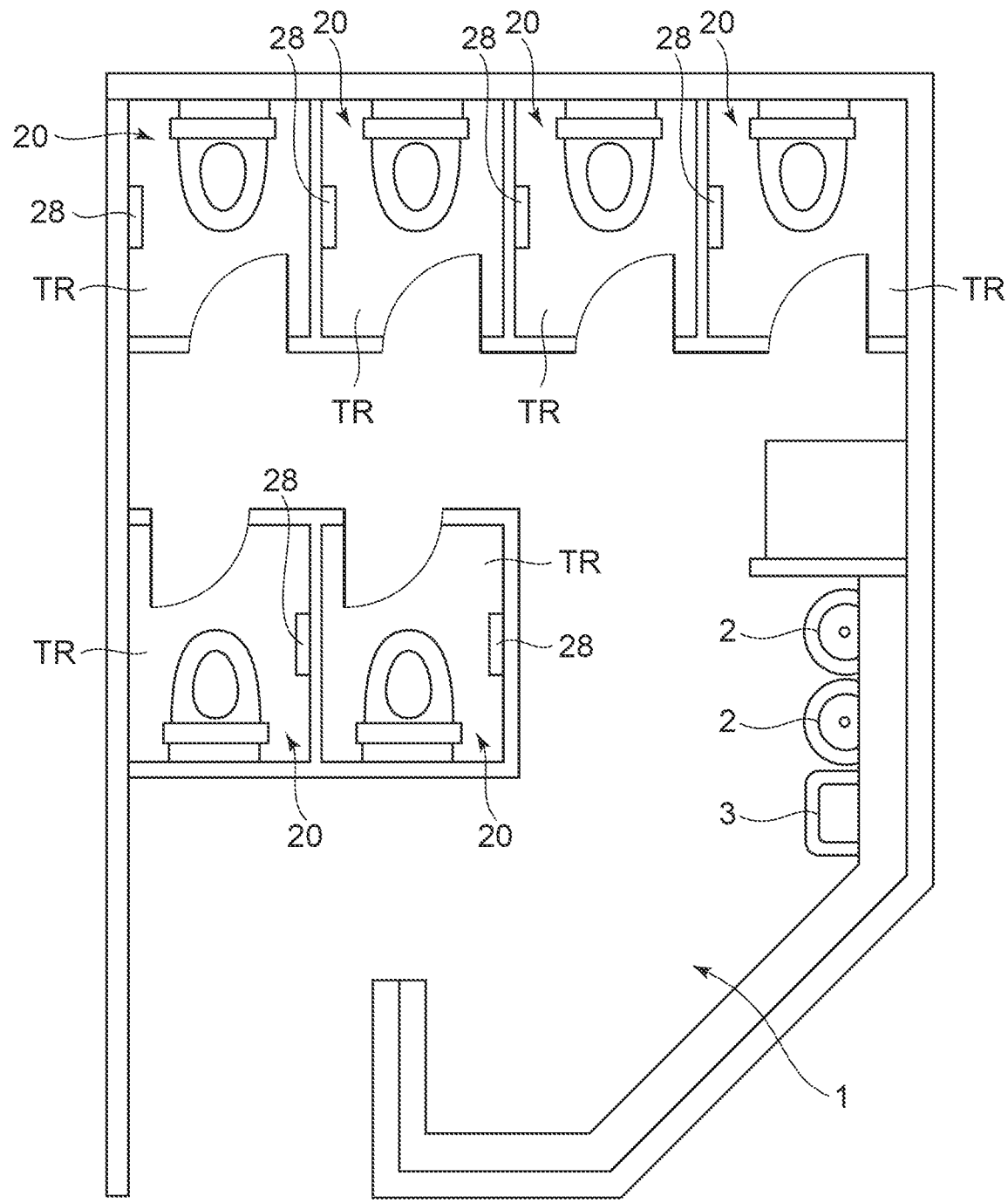
FIG. 1 is a plan view showing a public restroom that uses a toilet system according to an embodiment of the invention.

A first invention is a toilet device including a wireless communication part configured to communicate with a personal digital assistant, and a controller configured to control the wireless communication part; the wireless communication part includes first identification information that is unique, and second identification information that is modifiable; and the controller stores the second identification information when receiving a write signal of the second identification information transmitted from the personal digital assistant.

According to the toilet device, the wireless communication part and the personal digital assistant can be connected using the second identification information that is modifiable. Accordingly, the wireless communication part and the personal digital assistant can be connected by rewriting the second identification information as necessary.

A second invention is a toilet system including a toilet device and a use label; the toilet device includes a wireless communication part configured to communicate with a personal digital assistant, and a controller configured to control the wireless communication part; the wireless communication part includes first identification information that is unique, and second identification information that is modifiable; the use label is readable by the personal digital assistant and stores the second identification information; and when the wireless communication part and the personal digital assistant are communicatably connected based on the first identification information, the controller stores the second identification information when receiving the second identification information transmitted from the personal digital assistant.

According to the toilet system, for example, even when the use label is damaged or lost, a use label that stores a new second identification information can be used to rewrite the identification information of the wireless communication part with the new second identification information. Accordingly, the toilet system can be easy to use.

A third invention is the toilet system of the second invention that further includes a setting label readable by the personal digital assistant; and the first identification information is stored in the setting label.

According to the toilet system, the first identification information can be acquired merely by reading the setting label, and so the toilet system can be easy to use. For example, even when the use label is damaged or lost, a use label that stores a new second identification information can be used to rewrite the identification information of the wireless communication part to the new second identification information merely by reading the setting label without calling a builder, maintenance contractor, etc.

A fourth invention is the toilet system of the second or third invention, wherein when receiving a connection request signal including the stored second identification information, the controller connects the wireless communication part and the personal digital assistant transmitting the connection request signal.

According to the toilet system, the wireless communication part and the personal digital assistant are connected using the second identification information, and so even when, for example, the use label is damaged or lost, the toilet system can be utilized merely by changing the use label. Accordingly, the toilet system can be easy to use.

A fifth invention is the toilet system of the second or third invention, wherein a personal digital assistant of a user using the toilet device is configured to store, when reading the use label, the second identification information stored in the use label, and to connect with the wireless communication part when the second identification information transmitted from the wireless communication part matches the second identification information stored in the personal digital assistant of the user.

According to the toilet system, the wireless communication part and the personal digital assistant are connected using the second identification information, and so even when, for example, the use label is damaged or lost, the toilet system can be utilized merely by changing the use label. Accordingly, the toilet system can be easy to use.

A sixth invention is a method for setting a remote operation that is performed by a personal digital assistant configured to communicate with a wireless communication part of a toilet device; the method includes an initial setting process of causing the personal digital assistant to perform an initial setting of the toilet device when reading a setting label; first identification information of the wireless communication part is stored in the setting label; and the first identification information is unique.

According to the method for setting the remote operation, the initial setting of the toilet device can be easily performed merely by reading the setting label.

A seventh invention is the method for setting the remote operation of the sixth invention, further including a pairing process of causing the personal digital assistant to transmit a write signal of the second identification information when the personal digital assistant reads a use label storing second identification information of the wireless communication part in the initial setting process, the second identification information being modifiable.

According to the method for setting the remote operation, the personal digital assistant reads the setting label storing the first identification information and the use label storing the second identification information, and so erroneous input of the identification information can be suppressed. Also, the second identification information can be written merely by reading the use label with the personal digital assistant, and so the second identification information can be set easily.

An eighth invention is a method for setting a remote operation that is performed by a personal digital assistant configured to communicate with a wireless communication part of a toilet device; the method includes a connection establishment process and a use process; the connection establishment process includes causing the personal digital assistant to establish a connection with the wireless communication part when the personal digital assistant reads the use label storing second identification information of the wireless communication part, the second identification information being modifiable; and the use process includes causing the personal digital assistant to display an operation button of a functional unit of the toilet device in a display part when the connection with the wireless communication part is established.

According to the method for setting the remote operation, the user can easily connect the wireless communication part and the personal digital assistant merely by reading the use label. Also, the operation button of the functional unit of the toilet device is displayed by the display part when the connection with the wireless communication part is established, and so the operation can be easy to understand even when the personal digital assistant is used.

A ninth invention is a non-transitory computer-readable storage medium including program instructions stored in the non-transitory computer-readable storage medium; and the program instructions, when executed by a processor of the personal digital assistant according to the sixth invention, cause the personal digital assistant to perform the method according to the sixth invention.

According to the non-transitory computer-readable storage medium, a method for setting a remote operation can be provided in which the initial setting of the toilet device can be easily performed merely by reading the setting label.

A tenth invention is a non-transitory computer-readable storage medium including program instructions stored in the non-transitory computer-readable storage medium; and the program instructions, when executed by a processor of the personal digital assistant according to the eighth invention, cause the personal digital assistant to perform the method according to the eighth invention.

According to the non-transitory computer-readable storage medium, a method for setting a remote operation can be provided in which the user can easily connect the wireless communication part and the personal digital assistant merely by reading the use label. Also, the operation button of the functional unit of the toilet device is displayed by the display part when the connection with the wireless communication part is established, and so a method for setting a remote operation can be provided in which the operation can be easy to understand even when the personal digital assistant is used.

Embodiments of the invention will now be described with reference to the drawings. Similar components in the drawings are marked with the same reference numerals; and a detailed description is omitted as appropriate.

FIG. 1 is a plan view showing a public restroom that uses a toilet system according to an embodiment of the invention.

Figure 2:
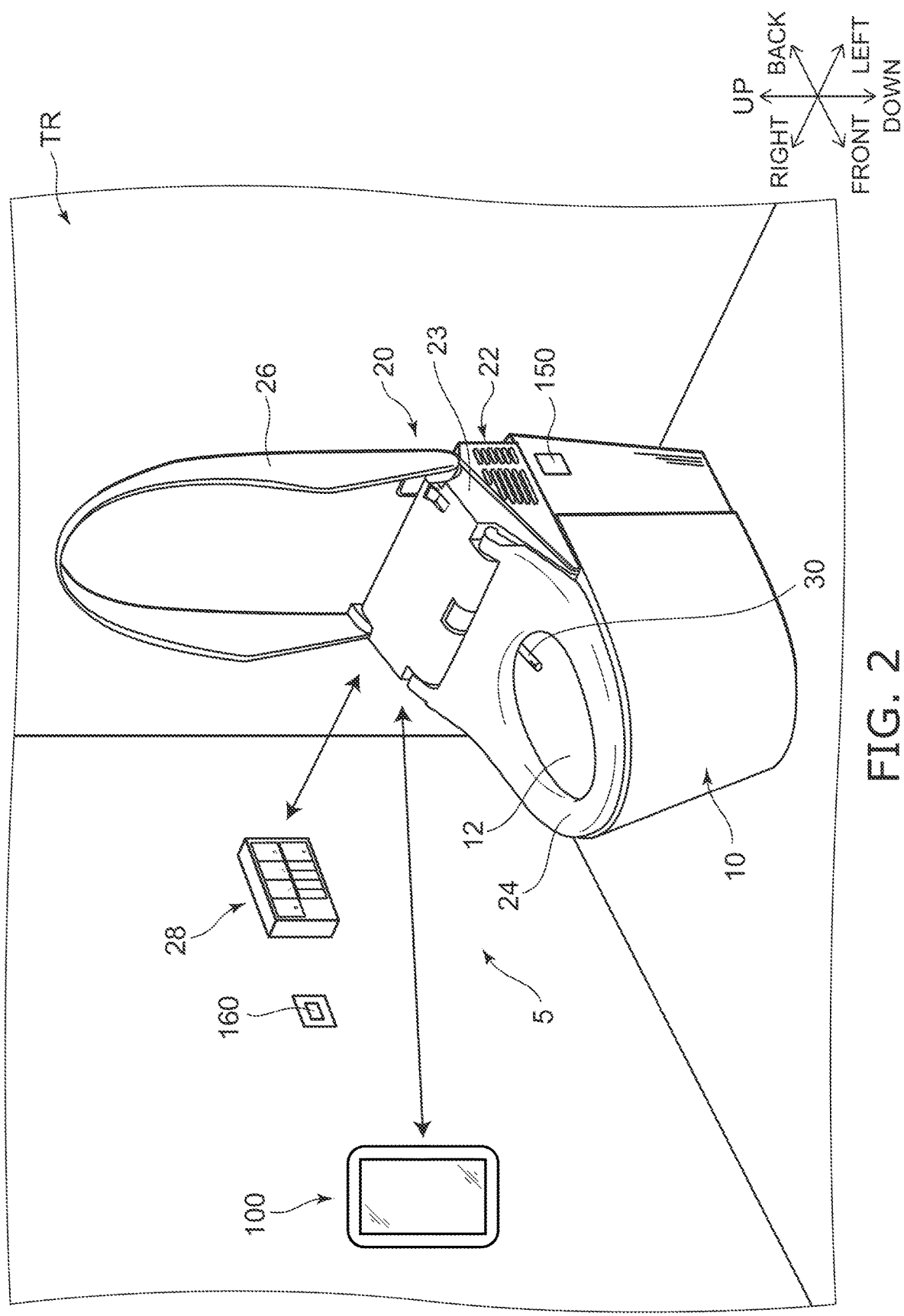
FIG. 2 is a perspective view showing the toilet room and the toilet system of FIG. 1.

FIG. 2 is a perspective view showing the toilet room and the toilet system of FIG. 1.

As shown in FIG. 1, the public restroom 1 includes a hand wash area 2, a hand dryer 3, and multiple toilet rooms TR. The public restroom 1 also may include urinals, etc. The public restroom 1 is, for example, a restroom that can be utilized by an unspecified number of users. The toilet room TR is not limited to being disposed in the public restroom 1, and may be a toilet room disposed in, for example, a home, etc.

As shown in FIG. 2, the toilet system 5 includes a toilet device 20 and a personal digital assistant 100. The toilet device 20 is mounted to a sit-down flush toilet 10 (called simply the "toilet" 10 for convenience in the following description).

The toilet 10 includes a bowl 12. The bowl 12 has a concave shape that is concave downward. The toilet 10 receives, in the bowl 12, excrement such as urine, feces, and the like of the user. A main part 22 of the toilet device 20 is mounted on the part of the toilet 10 behind the bowl 12.

Each toilet room TR includes, for example, a use label 160 and a setting label 150 dedicated to the toilet room TR (the toilet device 20). The setting label 150 and the use label 160 are used to communicatably connect the toilet device 20 and the personal digital assistant 100. The setting label 150 and the use label 160 are, for example, QR codes (registered trademark), NFC (Near Field Communication) tags, etc.

The setting label 150 is used by a manager, a builder, a maintenance contractor, or the like that manages the toilet room TR, and is disposed at a position that is, for example, not easily viewed by a general user of the toilet 10, the toilet device 20, etc. The setting label 150 stores unique first identification information of a second wireless communication part 62 described below, and is readable by the personal digital assistant 100.

The use label 160 is used by the user that uses the toilet room TR, and is disposed at a position that is easily viewed by the user such as, for example, a wall surface of the toilet room TR, etc. For example, the use label 160 may be disposed on a remote control 28 (described below), the toilet device 20, etc. The use label 160 stores modifiable second identification information of the second wireless communication part 62 (described below), and is readable by the personal digital assistant 100. The use label 160 that is disposed in each toilet room TR is associated by the manager with the second wireless communication part 62 of the toilet device 20 mounted in the same toilet room TR. The association task of the use label 160 and the second wireless communication part 62 and the connection task of the personal digital assistant 100 and the second wireless communication part 62 by the user are described below.

The toilet device 20 is mounted to the upper part of the toilet 10. The toilet device 20 may be mounted as continuous body with the toilet 10, or may be detachably mounted to the toilet 10.

The toilet device 20 includes the main part 22, a toilet seat 24, and a toilet lid 26. The main part 22 includes a casing 23, and multiple functional units disposed inside the casing 23. The toilet seat 24 is the part on which the user is seated, and has an opening that exposes the bowl 12. The user can excrete into the bowl 12 while sitting on the toilet seat 24. The toilet lid 26 is included in the toilet device 20 as necessary, and is omissible. The toilet seat 24 and the toilet lid 26 are pivotally supported to be rotatable with respect to the main part 22. In this specification, "up/upward", "down/downward", "front/frontward", "back/behind", "left", and "right" are directions when viewed by the user sitting on the toilet seat 24 with the user's back facing the open toilet lid 26.

The remote control 28 includes, for example, multiple switches, sensors, etc., and accepts operation instructions from the user. The remote control 28 is connected with the main part 22 via a wired or wireless connection, and transmits the operation instructions input from the user to the main part 22. The main part 22 (the functional units) performs prescribed operations according to the operation instructions input from the remote control 28. For example, the input of the operation instructions to the main part 22 may be performed using an operation panel disposed in the main part 22, etc. According to the embodiment, the functional units of the toilet device 20 can be operated by the personal digital assistant 100, and so the remote control 28 may be included as necessary.

A nozzle 30 is disposed in the casing 23. The nozzle 30 advances and retreats between a position stored inside the casing 23 and a position protruding frontward from the casing 23 to be advanced into the bowl 12. FIG. 2 illustrates a state in which the nozzle 30 is advanced into the bowl 12.

The toilet device 20 includes a sanitary washing functional unit that washes a private part such as a "bottom" or the like of the user by discharging wash water from the nozzle 30 toward the private part of the user while the nozzle 30 is advanced into the bowl 12.

The personal digital assistant 100 is, for example, a smartphone, a tablet terminal, or the like possessed by the manager or user. However, the personal digital assistant 100 is not limited to such a terminal, and may be any terminal that can be carried by the manager or user.

A program 200 (application software) for remotely operating the functional units of the toilet device 20 is installed in the personal digital assistant 100. The personal digital assistant 100 performs a remote operation mode of remotely operating the functional units based on the program 200. According to the toilet system 5, the user can activate the program 200 in the personal digital assistant 100 and remotely operate the operations of the functional units with the personal digital assistant 100. For example, the application software may be automatically deleted after a prescribed period has elapsed after installation.

In the toilet system 5, for example, the operations of the functional units of the toilet device 20 can be remotely operated by the personal digital assistant 100. In other words, in the toilet system 5, the operations of the functional units, etc., can be remotely operated by operating one of the remote control 28 or the personal digital assistant 100. The functional units of the toilet device 20 that are remotely operated by the personal digital assistant 100 may be the same as or different from those of the remote control 28.

Figure 3:
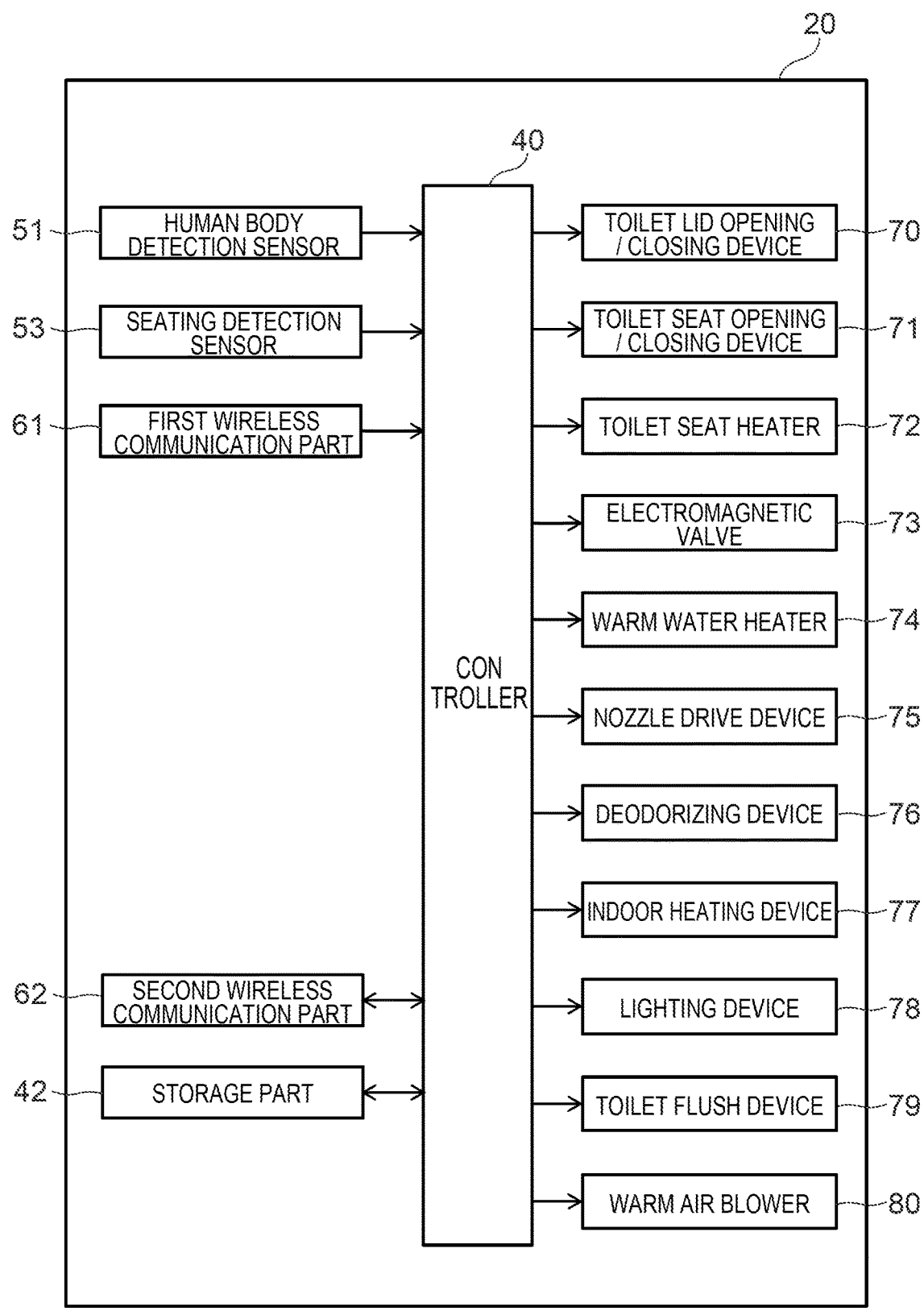
FIG. 3 is a block diagram showing a control system of the toilet device.

FIG. 3 is a block diagram showing a control system of the toilet device.

As shown in FIG. 3, the toilet device 20 includes the multiple functional units. The functional units are disposed in the casing 23. The functional units are, for example, a controller 40, a storage part 42, a human body detection sensor 51, a seating detection sensor 53, a first wireless communication part 61, a second wireless communication part 62, a toilet lid opening/closing device 70, a toilet seat opening/closing device 71, a toilet seat heater 72, an electromagnetic valve 73, a warm water heater 74, a nozzle drive device 75, a deodorizing device 76, an indoor heating device 77, a lighting device 78, a toilet flush device 79, a warm air blower 80, etc.

The storage part 42 stores various control programs and various data for controlling the operations of the components of the toilet device 20. The controller 40 reads the various programs and data stored in the storage part 42 and performs sequential processing to comprehensively control the operations of the components of the toilet device 20. The storage part 42 also stores identification information of the second wireless communication part 62 and a program for wirelessly connecting the personal digital assistant 100 and the toilet device 20.

The human body detection sensor 51 detects a human body approaching the toilet device 20. In other words, the human body detection sensor 51 detects the human body entering the toilet room TR. The human body detection sensor 51 includes, for example, a pyroelectric sensor, radio wave sensor, infrared sensor, etc. The human body detection sensor 51 is connected with the controller 40. The human body detection sensor 51 outputs the detection result of the human body toward the controller 40.

The seating detection sensor 53 detects the seating on the toilet seat 24. The seating detection sensor 53 includes a detection state in which the seating on the toilet seat 24 is detected, and a nondetection state in which the seating on the toilet seat 24 is not detected. The seating detection sensor 53 includes, for example, a mechanical switch, electrostatic sensor, etc. The seating detection sensor 53 is connected with the controller 40. The seating detection sensor 53 outputs the detection result of the human body toward the controller 40.

The first wireless communication part 61 wirelessly communicates with the remote control 28. The first wireless communication part 61 is, for example, an infrared light-receiving device that receives an infrared signal transmitted from the remote control 28. The first wireless communication part 61 is connected with the controller 40. The first wireless communication part 61 outputs the command signal transmitted from the remote control 28 toward the controller 40. The remote control 28 and the first wireless communication part 61 may wirelessly communicate by a radio signal. The first wireless communication part 61 is unnecessary when the remote control 28 is not mounted in the toilet room TR.

The second wireless communication part 62 wirelessly communicates with the personal digital assistant 100. For example, the second wireless communication part 62 performs bidirectional wireless communication with the personal digital assistant 100. The second wireless communication part 62 includes, for example, a wireless communication device that conforms communication standards such as Bluetooth (registered trademark), ZigBee (registered trademark), Thread (registered trademark), WiFi (registered trademark), etc. Hereinbelow, an example is described in which BLE (Bluetooth Low Energy) is used for the wireless communication between the second wireless communication part 62 and the personal digital assistant 100. Bluetooth Classic may be used for the wireless communication between the second wireless communication part 62 and the personal digital assistant 100.

The second wireless communication part 62 is connected with the controller 40. The second wireless communication part 62 outputs the command signal transmitted from the personal digital assistant 100 toward the controller 40, and transmits a command signal based on an instruction of the controller 40 to the personal digital assistant 100. The first wireless communication part 61 and the second wireless communication part 62 may be separate units, or may be an integrated unit as in a configuration in which the first wireless communication part 61 and the second wireless communication part 62 are disposed on the same substrate or inside the same unit.

The second wireless communication part 62 is included in the wireless communication part of the invention. The second wireless communication part 62 outputs the unique first identification information and the modifiable second identification information. The first identification information is individually set for each second wireless communication part 62, and is identification information that cannot be modified (overwritten). The first identification information is prestored in the storage part 42. The first identification information may be stored in another storage part. The first identification information is prestored in the setting label 150. The first identification information is used to wirelessly connect the second wireless communication part 62 and the personal digital assistant 100 of the manager when the manager performs the initial setting (the setting) of the remote operation mode. In other words, the first identification information is a setting ID used by the manager.

The second identification information is identification information that can be modified (overwritten). The second identification information is stored in the storage part 42 by the manager in the initial setting. The second identification information may be prestored in the storage part 42. The second identification information may be stored in another storage part. The second identification information is prestored in the use label 160. The second identification information is used by the user entering the toilet room TR to wirelessly connect the user's personal digital assistant 100 with the toilet device 20. In other words, the second identification information is a use ID that is used by the user. The controller 40 determines the presence or absence of a wireless connection by comparing the identification information transmitted from the personal digital assistant 100 and the first and second identification information stored in the storage part 42. The initial setting by the manager and the wireless connection task by the user are described below.

The toilet lid opening/closing device 70 is connected with the controller 40 and automatically opens and closes the toilet lid 26 based on a control of the controller 40. For example, the controller 40 opens the toilet lid 26 based on detection of the human body by the human body detection sensor 51, and closes the toilet lid 26 based on nondetection of the human body by the human body detection sensor 51. For example, the controller 40 opens and closes the toilet lid 26 by driving the toilet lid opening/closing device 70 according to operations of the remote control 28 or the personal digital assistant 100.

The toilet seat opening/closing device 71 is connected with the controller 40, and automatically opens and closes the toilet seat 24 based on a control of the controller 40. For example, the controller 40 opens and closes the toilet seat 24 by driving the toilet seat opening/closing device 71 according to operations of the remote control 28 or the personal digital assistant 100. The toilet seat heater 72 is disposed inside the toilet seat 24 and warms the seat surface of the toilet seat 24 from the inside. The toilet seat heater 72 is connected with the controller 40 and warms the seat surface of the toilet seat 24 based on a control of the controller 40. For example, the controller 40 controls the driving of the toilet seat heater 72 so that the temperature of the seat surface of the toilet seat 24 matches the temperature set by an operation of the remote control 28 or the personal digital assistant 100.

The electromagnetic valve 73 is disposed between a water supply source and the nozzle 30. Wash water is supplied to the nozzle 30 by opening the electromagnetic valve 73. The supply of the wash water to the nozzle 30 is stopped by closing the electromagnetic valve 73. The electromagnetic valve 73 is connected with the controller 40. The electromagnetic valve 73 switches between supplying the wash water to the nozzle 30 and stopping the supply of the wash water to the nozzle 30 based on a control of the controller 40. For example, the controller 40 controls the opening and closing of the electromagnetic valve 73 by operations of the remote control 28 or the personal digital assistant 100.

The warm water heater 74 is disposed downstream of the electromagnetic valve 73. The warm water heater 74 is connected with the controller 40. For example, the warm water heater 74 heats the wash water supplied from the water supply source to a specified temperature based on a control of the controller 40. The warm water heater 74 converts the wash water supplied from the water supply source into warm water of the set temperature. For example, the warm water heater 74 may be an instant heating-type (instantaneous-type) heat exchanger that uses a ceramic heater or the like, or a warm water storage heating-type heat exchanger that uses a warm water storage tank.

For example, the controller 40 is configured to set the warm water temperature due to an operation of the remote control 28 or the personal digital assistant 100. The user can set the warm water temperature to a desired temperature by operating the remote control 28 or the personal digital assistant 100.

The nozzle drive device 75 causes the nozzle 30 to advance and retreat between a position stored inside the main part 22, and a position protruded frontward from the main part 22 to be advanced into the bowl 12. The nozzle drive device 75 is connected with the controller 40. The nozzle drive device 75 causes the nozzle 30 to advance and retreat based on a control of the controller 40.

For example, the controller 40 is configured to adjust the position of the nozzle 30 while advanced into the bowl 12 due to an operation of the remote control 28 or the personal digital assistant 100. The user can adjust the position in the longitudinal direction of the nozzle 30 or the like to be at the desired position by operating the remote control 28 or the personal digital assistant 100 while the nozzle 30 is advanced into the bowl 12. The nozzle 30, the electromagnetic valve 73, and the nozzle drive device 75 are the sanitary washing functional unit for washing the private part of the user.

The deodorizing device 76 deodorizes the air inside the bowl 12 by suctioning air inside the bowl 12 of the toilet 10, decreasing offensive odor components and the like included in the suctioned air, and then discharging the air outside the main part 22. The deodorizing device 76 is connected to the controller 40, and deodorizes the air inside the bowl 12 based on a control of the controller 40. For example, the controller 40 operates the deodorizing device 76 for a prescribed period when the seating detection sensor 53 detects the user leaving the toilet seat 24. For example, the controller 40 operates the deodorizing device 76 due to an operation of the remote control 28 or the personal digital assistant 100.

The indoor heating device 77 heats the interior of the toilet room TR by blowing warm air outside the main part 22. The indoor heating device 77 is connected to the controller 40, and heats the interior of the toilet room TR based on a control of the controller 40. For example, the controller 40 is configured to set the indoor temperature due to an operation of the remote control 28 or the personal digital assistant 100. The user can set the set temperature inside the toilet room TR to the desired temperature by operating the remote control 28 or the personal digital assistant 100.

The lighting device 78 illuminates the interior of the bowl 12 of the toilet 10. The lighting device 78 is connected to the controller 40, and illuminates the interior of the bowl 12 based on a control of the controller 40. For example, the controller 40 makes the bowl 12 easy to view at night, etc., by switching the lighting device 78 on based on the detection of the human body by the human body detection sensor 51. The user can switch the lighting device 78 on and off by operating the remote control 28 or the personal digital assistant 100.

The toilet flush device 79 flushes the toilet 10 by supplying wash water to the toilet 10. For example, the toilet flush device 79 is disposed in a water supply tank of the toilet 10, a water supply pipe of the toilet 10, etc., and automatically flushes the toilet 10. The toilet flush device 79 is connected to the controller 40 and flushes the toilet 10 based on a control of the controller 40. For example, in response to the human body detection sensor 51 or the seating detection sensor 53 detecting the user leaving the toilet seat 24, the controller 40 flushes the toilet 10 by operating the toilet flush device 79. The user can operate the toilet flush device 79 by operating the remote control 28 or the personal digital assistant 100.

The warm air blower 80 blows warm air toward the private part of the user. For example, the warm air blower 80 dries the private part of the user wetted by the private part wash or the like by blowing warm air toward the private part of the user. The warm air blower 80 is connected with the controller 40. The warm air blower 80 switches between blowing warm air and stopping the blowing of the warm air toward the private part of the user based on a control of the controller 40. The user can operate the warm air blower 80 by operating the remote control 28 or the personal digital assistant 100.

Thus, the toilet device 20 includes, for example, the functional units of the toilet lid opening/closing device 70, the toilet seat opening/closing device 71, the toilet seat heater 72, the electromagnetic valve 73, the warm water heater 74, the nozzle drive device 75, the deodorizing device 76, the indoor heating device 77, the lighting device 78, the toilet flush device 79, the warm air blower 80, etc. The functional units are not limited to those described above, and may be any functional unit that performs a prescribed operation associated with the utilization of the toilet device 20. Any number of functional units may be disposed in the toilet device 20. The number of functional units disposed in the toilet device 20 may be, for example, 1.

In the toilet system 5, the operations of the functional units of the toilet device 20 can be remotely operated by operating one of the remote control 28 or the personal digital assistant 100. The controller 40 of the toilet device 20 controls the operations of the multiple functional units based on signals received from the remote control 28 via the first wireless communication part 61. The controller 40 controls the operations of the multiple functional units based on the signals received from the personal digital assistant 100 via the second wireless communication part 62. The controller 40 is configured to perform a personal digital assistant use mode of controlling the operations of the multiple functional units based on signals received from the personal digital assistant 100 via the second wireless communication part 62. The toilet device 20 may include a dedicated controller that controls the second wireless communication part 62. The toilet device 20 may perform various controls by communication between the controller 40 and the dedicated controller of the second wireless communication part 62.

Figure 4:
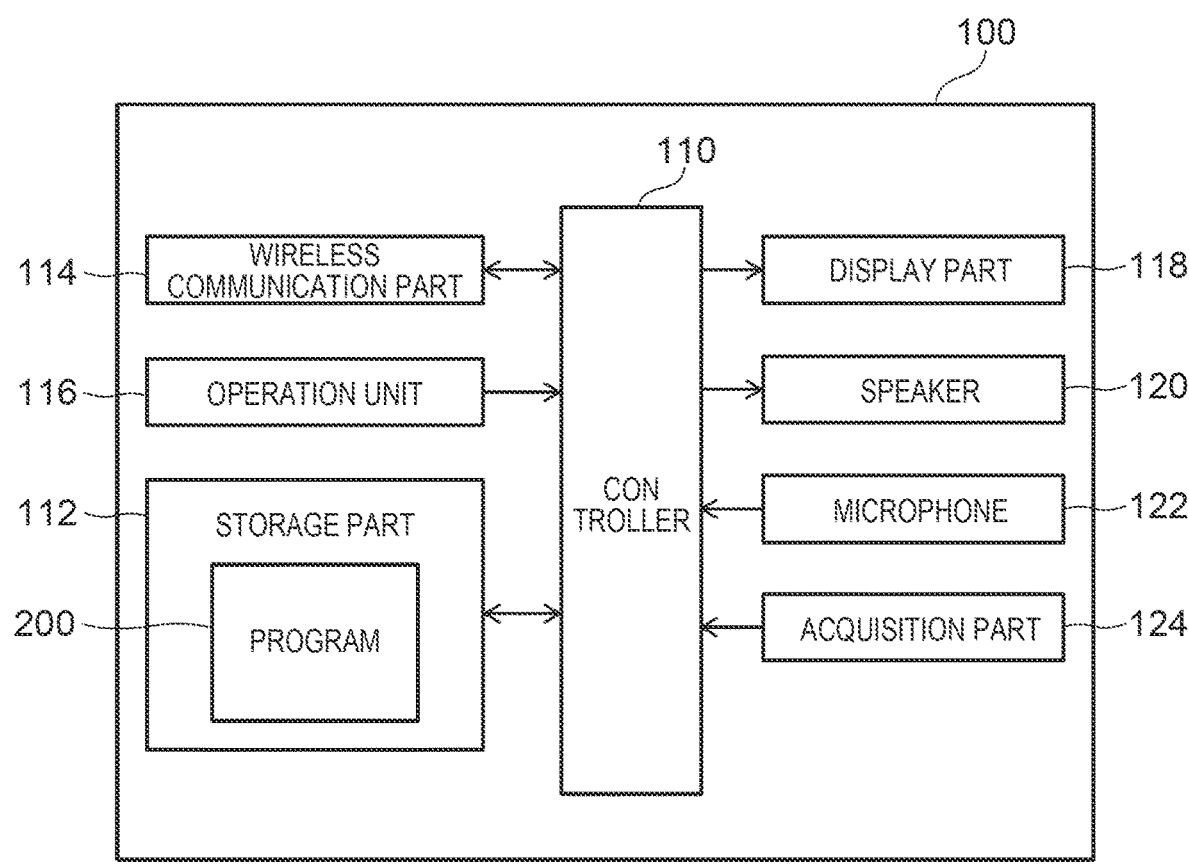
FIG. 4 is a block diagram showing a control system of the personal digital assistant.

FIG. 4 is a block diagram showing a control system of the personal digital assistant.

As shown in FIG. 4, the personal digital assistant 100 includes a controller 110, a storage part 112, a wireless communication part 114, an operation unit 116, a display part 118, a speaker 120, a microphone 122, and an acquisition part 124.

The storage part 112 stores various control programs and various data for controlling the operations of the components of the personal digital assistant 100. The controller 110 reads the various programs and data stored in the storage part 42 and performs sequential processing to comprehensively control the operations of the components of the personal digital assistant 100. The storage part 112 also stores the device identification information of the personal digital assistant 100.

The wireless communication part 114 wirelessly communicates with the second wireless communication part 62 of the toilet device 20. The wireless communication part 114 includes a wireless communication device that conforms to the same communication standard as the second wireless communication part 62. The wireless communication part 114 is connected with the controller 110. The wireless communication part 114 outputs command signals transmitted from the second wireless communication part 62 of the toilet device 20 toward the controller 110. The wireless communication part 114 transmits command signals output from the controller 110 to the second wireless communication part 62 of the toilet device 20.

The operation unit 116 accepts an input of operation instructions from the user, etc. The operation unit 116 includes, for example, a touch panel. The operation unit 116 may be, for example, a mechanical switch, another sensor, etc., or may be configured using a pair of such components. The operation unit 116 is connected with the controller 110. The operation unit 116 outputs the operation instructions that are input toward the controller 110. For example, the controller 110 controls the operations of the components of the wireless communication part 114, etc., according to the operation instructions input from the operation unit 116.

The display part 118 displays various operation screens, etc. The display part 118 includes, for example, a display device such as a liquid crystal display, an organic EL display, etc. The display part 118 is connected with the controller 110, and performs various displays based on a control of the controller 110. For example, when the operation unit 116 is a touch panel, the operation unit 116 is arranged to overlap the display part 118.

The speaker 120 outputs various sounds. The speaker 120 is connected with the controller 110, and outputs various sounds based on a control of the controller 110.

The microphone 122 converts the input sound into an electrical signal. The microphone 122 is connected with the controller 110, and outputs the converted electrical signal toward the controller 110. The operations of the toilet device 20 by the personal digital assistant 100 may performed by voice information acquired by the microphone 122.

The acquisition part 124 is a part that acquires information of the setting label 150 and the use label 160. For example, when the setting label 150 and the use label 160 are QR codes (registered trademark), the acquisition part 124 is an imaging device (a camera). For example, when the setting label 150 and the use label 160 are NFC tags, the acquisition part 124 is a reading device. The acquisition part 124 outputs the acquired information toward the controller 110.

The storage part 112 stores the program 200 for the remote operation of the functional units of the toilet device 20 by the personal digital assistant 100. In other words, the program 200 (an application) for the remote operation is installed in the personal digital assistant 100.

For example, the controller 110 reads the program 200 from the storage part 112 according to an instruction to activate the program 200 from the operation unit 116. Then, the controller 110 makes it possible to remotely operate the functional units of the toilet device 20 by operating the remote operation mode based on the program 200.

An initial setting task performed by the manager will now be described with reference to FIGS. 5 to 8.

Figure 5:
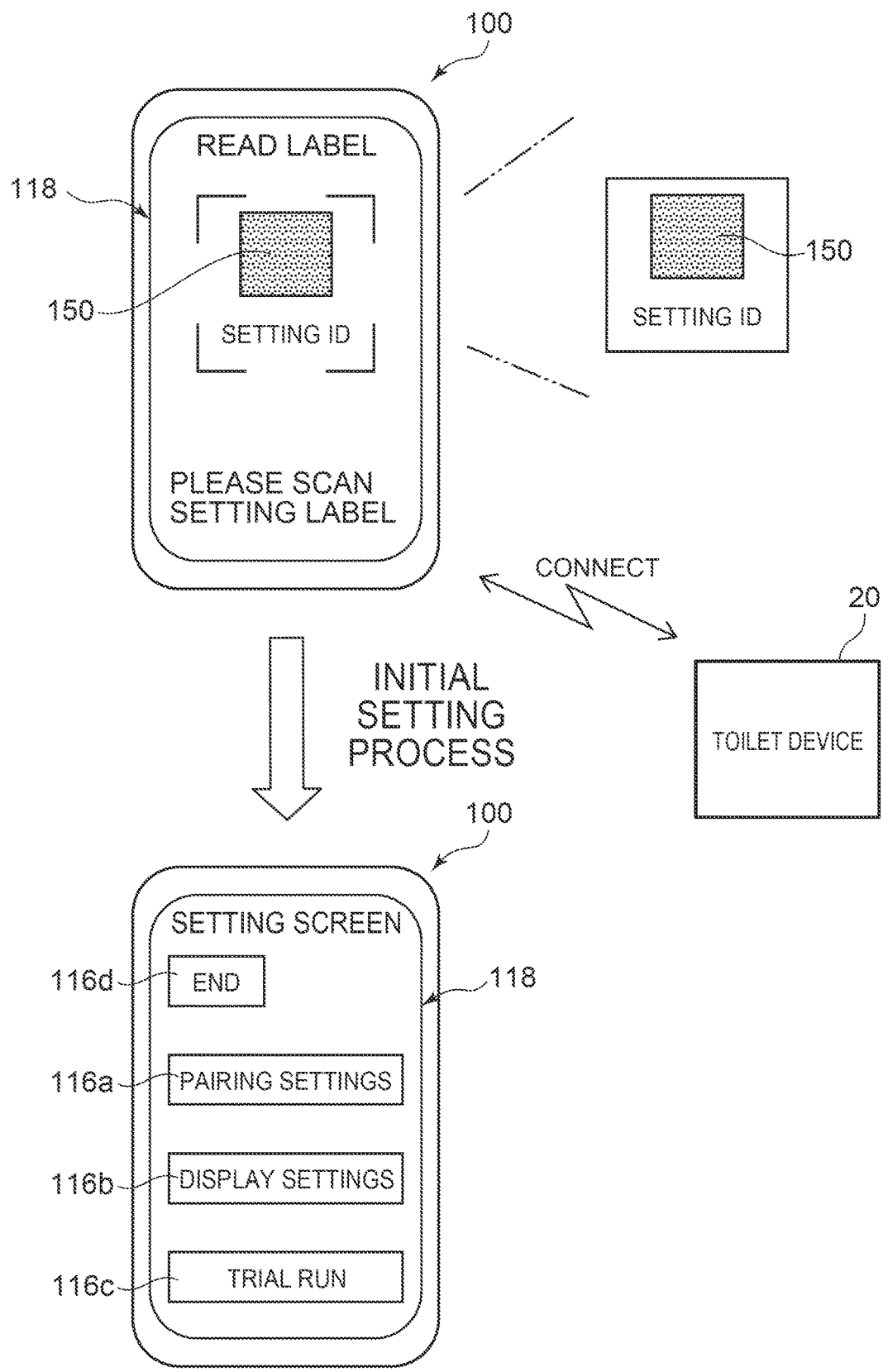
FIG. 5 is an explanatory drawing showing an initial setting to communicatably connect the toilet device and the personal digital assistant.

FIG. 5 is an explanatory drawing showing an initial setting to communicatably connect the toilet device and the personal digital assistant.

Figure 6:
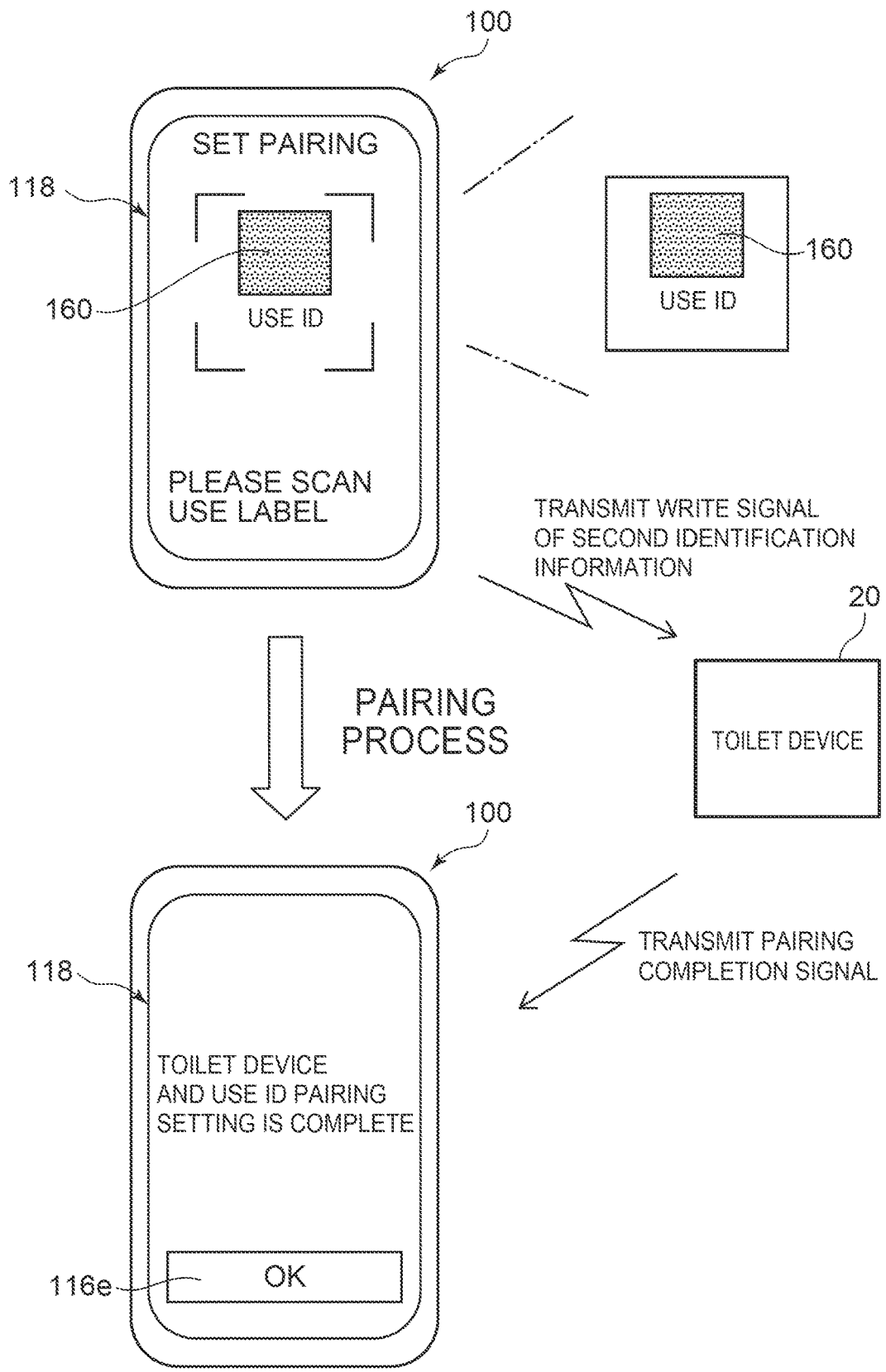
FIG. 6 is an explanatory drawing when associating the use ID with the toilet device.

FIG. 6 is an explanatory drawing when associating the use ID with the toilet device.

Figure 7:
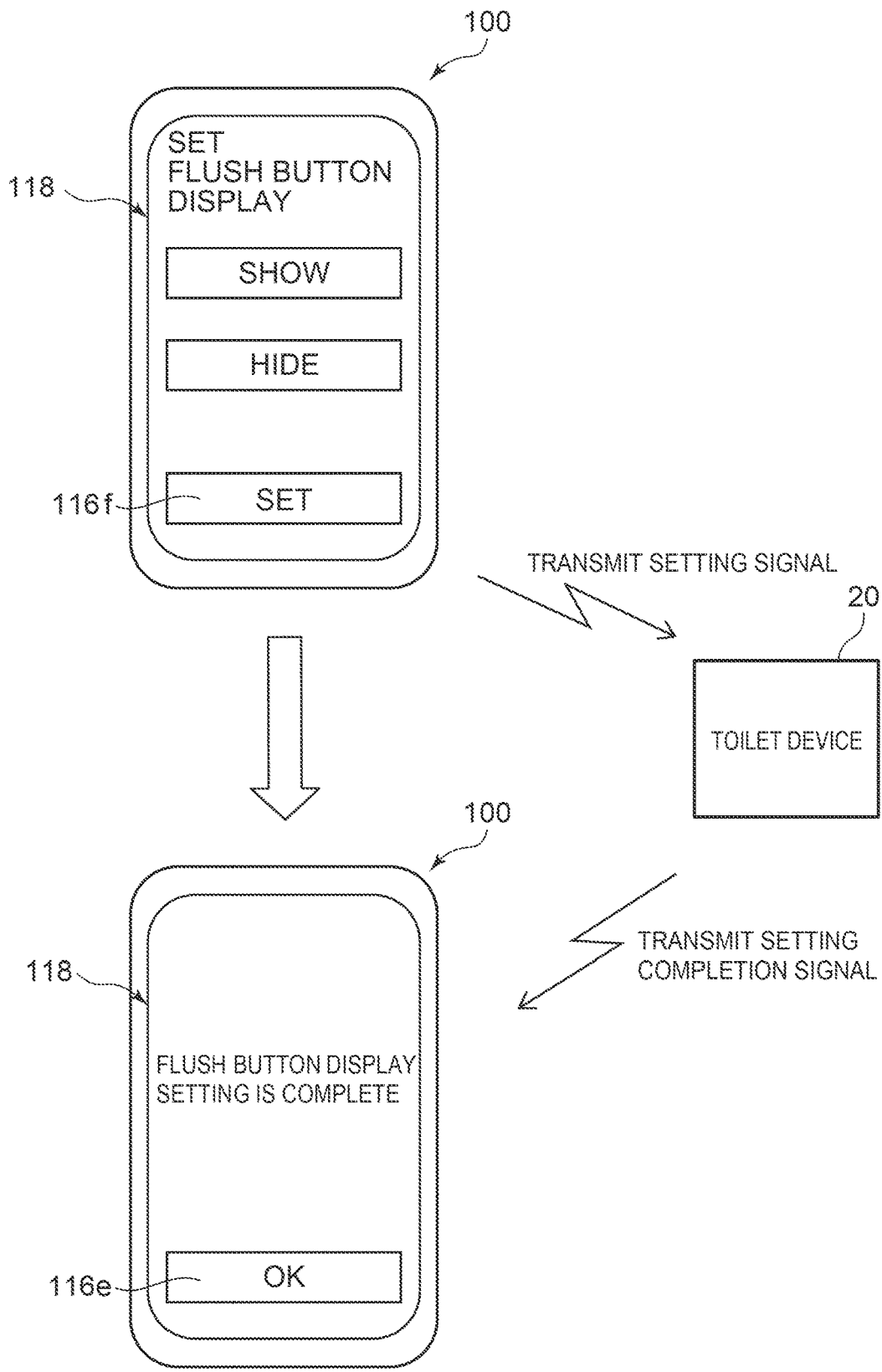
FIG. 7 is an explanatory drawing when setting the operation buttons displayed in the personal digital assistant.

FIG. 7 is an explanatory drawing when setting the operation buttons displayed in the personal digital assistant.

Figure 8:
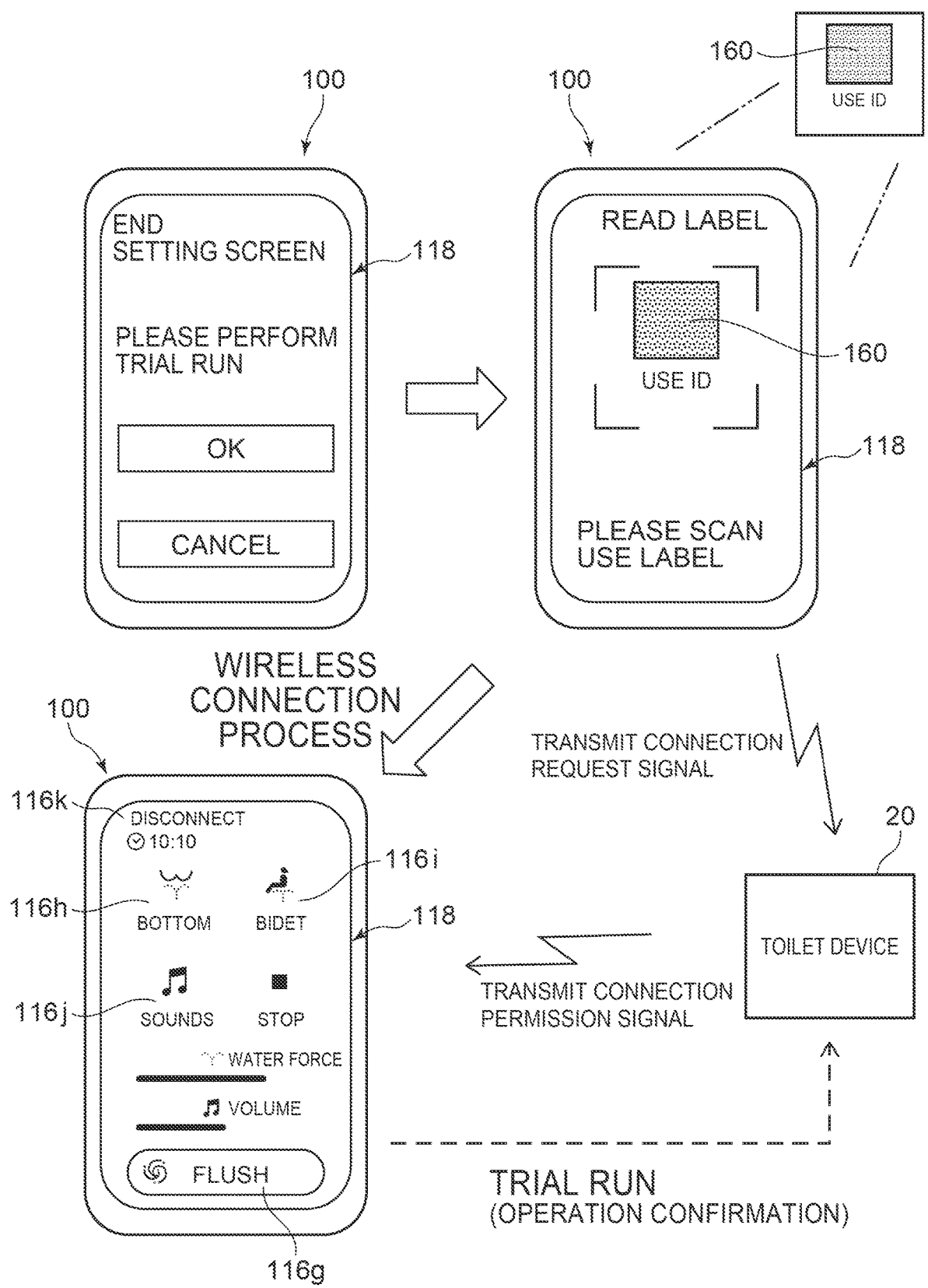
FIG. 8 is an explanatory drawing when performing a trial run after the initial setting.

FIG. 8 is an explanatory drawing when performing a trial run after the initial setting.

First, the manager prepares the use label 160 and enters the toilet room TR. Then, the manager activates the program 200 (the application) of the remote operation stored in the storage part 112. Subsequently, as shown in FIG. 5, the setting label 150 is read by the acquisition part 124 inside the application. Or, the manager uses the acquisition part 124 to read the setting label 150 as shown in FIG. 5. The program 200 (the application) of the remote operation stored in the storage part 112 is activated thereby. When the application is not installed in the personal digital assistant 100, the processing may proceed to an acquisition (download) process of the application via an Internet network when the setting label 150 is read by the personal digital assistant 100.

The program 200 of the application includes control processing of causing the wireless communication part 114 to automatically transmit the first identification information when the setting label 150 is acquired. Accordingly, the personal digital assistant 100 transmits the first identification information stored in the setting label 150 when acquiring the setting label 150.

The controller 40 of the toilet device 20 compares the first identification information transmitted from the personal digital assistant 100 and the first identification information stored in the storage part 42. Then, when both of the identification information match, a wireless connection between the second wireless communication part 62 and the personal digital assistant 100 of the manager is established. The establishment determination of the wireless connection may be performed by a dedicated controller for controlling the second wireless communication part 62.

Then, as shown in FIG. 5, when the wireless connection with the second wireless communication part 62 is established, the personal digital assistant 100 causes the display part 118 to display a setting screen (an initial setting screen). Namely, when reading the setting label 150 storing the unique first identification information of the second wireless communication part 62, the program 200 installed in the personal digital assistant 100 performs an initial setting process of performing an initial setting of the toilet device 20.

The functions of the toilet device 20 cannot be operated by the personal digital assistant 100 with the wireless connection at this time. Accordingly, for example, the user cannot operate the functional units of the toilet device 20 even though the user has read the setting label 150 with the user's personal digital assistant 100 and has made a wireless connection with the second wireless communication part 62.

As shown in FIG. 5, the setting screen displays, for example, a pairing setting button 116*a*, a display setting button 116*b*, a trial run button 116*c*, an end button 116*d*, etc. The pairing setting button 116*a* is used to perform a pairing setting of pairing the use label 160 (the second identification information) and the second wireless communication part 62 so that the user can use the remote operation mode. The display setting button 116*b* is used to set the types (forms) of the operation buttons displayed in the personal digital assistant 100 of the user. The trial run button 116*c* is used by the manager to perform a trial run of the remote operation mode after the initial setting has ended.

First, the manager operates the pairing setting button 116*a*. As a result, as shown in FIG. 6, a screen for reading the use label 160 is displayed by the display part 118 of the personal digital assistant 100. Then, the manager reads the use label 160 using the acquisition part 124.

The program 200 that is stored in the storage part 112 of the personal digital assistant 100 automatically transmits a write signal of the second identification information from the wireless communication part 114 when the use label 160 is acquired. Accordingly, when acquiring the use label 160, the personal digital assistant 100 transmits the second identification information stored in the use label 160. Namely, the program 200 that is installed in the personal digital assistant 100 performs a pairing process of transmitting the write signal of the second identification information when the use label 160 storing the modifiable second identification information of the second wireless communication part 62 is read in the initial setting process. The write signal of the second identification information is not limited to being automatically transmitted, and may be transmitted based on an operation by the manager.

The controller 40 of the toilet device 20 stores the received second identification information in the storage part 42. When storing different second identification information in the storage part 42, the second identification information is rewritten (overwritten) with the new second identification information. The use label 160 and the second wireless communication part 62 are paired (associated) thereby.

When the second identification information is stored in the storage part 42, the controller 40 causes the second wireless communication part 62 to transmit a pairing completion signal. When receiving the pairing completion signal, for example, the controller 110 of the personal digital assistant 100 causes the display part 118 to display "toilet device and use ID pairing setting is complete" or the like as shown in FIG. 6. Then, when a confirm button 116e is operated, the controller 110 of the personal digital assistant 100 returns the display part 118 to the setting screen of FIG. 5.

When storing the second identification information, the second wireless communication part 62 sets both the first and second identification information as identification information of the second wireless communication part 62. Then, the second wireless communication part 62 continuously outputs the second identification information stored in the storage part 42 and the first identification information.

Then, the manager operates the display setting button 116b. As a result, as shown in FIG. 7, the display part 118 of the personal digital assistant 100 displays a screen for performing the display setting of the operation buttons for operating the functional units of the toilet device 20. In the example, it is set whether or not to display a flush button 116g (see FIG. 8). For example, the display of the flush button 116g may be set to "hide" when the toilet device 20 includes an automatic flush function of automatically flushing with wash water when the human body detection sensor 51 or the seating detection sensor 53 switches from the detection state to the nondetection state of the human body. The display setting of the operation button may be set not only for the flush button 116g but also for other operation buttons.

The manager performs the display setting and then operates a transmit button 116f. As a result, the controller 110 of the personal digital assistant 100 transmits a setting signal of the display setting from the wireless communication part 114. When receiving the setting signal, the controller 40 of the toilet device 20 stores the setting content in the storage part 42 and transmits a setting completion signal from the second wireless communication part 62.

When receiving the setting completion signal, the controller 110 of the personal digital assistant 100 causes the display part 118 to display that the setting is complete. Then, when the confirm button 116e is operated, the controller 110 of the personal digital assistant 100 returns the display part 118 to the setting screen of FIG. 5.

Continuing, the manager operates the trial run button 116c. As a result, as shown in FIG. 8, the screen for reading the use label 160 is displayed by the display part 118 of the personal digital assistant 100. If the end button 116d is operated at the setting screen without performing a trial run, a screen that prompts a trial run may be displayed by the display part 118 as shown in FIG. 8.

Then, the manager reads the use label 160 using the acquisition part 124. The program 200 that is stored in the storage part 112 of the personal digital assistant 100 automatically transmits the second identification information from the wireless communication part 114 when acquiring the use label 160. Accordingly, when acquiring the use label 160, the personal digital assistant 100 transmits a connection request signal including the second identification information stored in the use label 160.

The controller 40 of the toilet device 20 compares the second identification information of the connection request signal transmitted from the personal digital assistant 100 and the second identification information stored in the storage part 42. Then, when both identification information match, the controller 40 performs a wireless connection process of establishing a wireless connection between the personal digital assistant 100 and the second wireless communication part 62.

In addition to the comparison of the second identification information, the controller 40 may compare the first identification information to determine whether or not to establish a wireless connection. Specifically, for example, the second identification information of the connection request signal transmitted from the personal digital assistant 100 and the second identification information stored in the storage part 42 are compared, and the personal digital assistant 100 and the controller 40 communicate when both identification information match. At this time, the controller 40 transmits the first identification information to the personal digital assistant 100. The personal digital assistant 100 transmits the first identification information received from the controller 40 back to the controller 40. The controller 40 determines whether or not the first identification information received from the personal digital assistant 100 matches the first identification information stored in the storage part 42. Then, when the first identification information matches, the controller 40 establishes the wireless connection between the personal digital assistant 100 and the second wireless communication part 62. In such a case, the personal digital assistant 100 may be configured to perform the comparison of the first identification information.

When the wireless connection is established, the controller 40 causes the second wireless communication part 62 to transmit a connection permission signal. The connection permission signal includes information related to the display settings stored in the storage part 42. As shown in FIG. 8, when receiving the connection permission signal, the controller 110 of the personal digital assistant 100 causes the display part 118 to display a display (an operation screen) of the operation buttons based on the information related to the display setting. The connection request signal may be transmitted from the second wireless communication part 62 of the toilet device 20. In such a case, for example, the connection request signal is continuously transmitted from the toilet device 20; and when the personal digital assistant 100 acquires the use label 160, the second identification information acquired by the personal digital assistant 100 and the second identification information stored in the storage part 42 are compared.

In the example, in addition to the flush button 116g, the display part 118 displays a bottom wash button 116h, a bidet wash button 116i, a privacy sounds button 116j, etc. When the display of the flush button 116g is set to "hide" in the display setting described above, the connection permission signal includes a signal to "hide" the display of the flush button 116g. In such a case, the flush button 116g is not displayed by the display part 118.

Then, for example, the manager operates the bottom wash button 116h. The controller 110 of the personal digital assistant 100 transmits a bottom wash command signal toward the second wireless communication part 62. When receiving the bottom wash command signal, the controller 40 of the toilet device 20 operates the nozzle drive device 75 and causes the nozzle 30 to advance into the bowl 12.

As a result, the manager can confirm that the pairing between the use label 160 and the second wireless communication part 62 is successful. The manager disconnects the wireless connection with the second wireless communication part 62 by operating a disconnect button 116k. Finally, the manager completes the initial setting by mounting the use label 160 to the wall surface of the toilet room TR or the like. The initial setting may be performed by a builder or maintenance contractor instead of the manager.

A case where the user operates the functional units of the toilet device 20 with the user's personal digital assistant 100 will be described.

Figure 9:
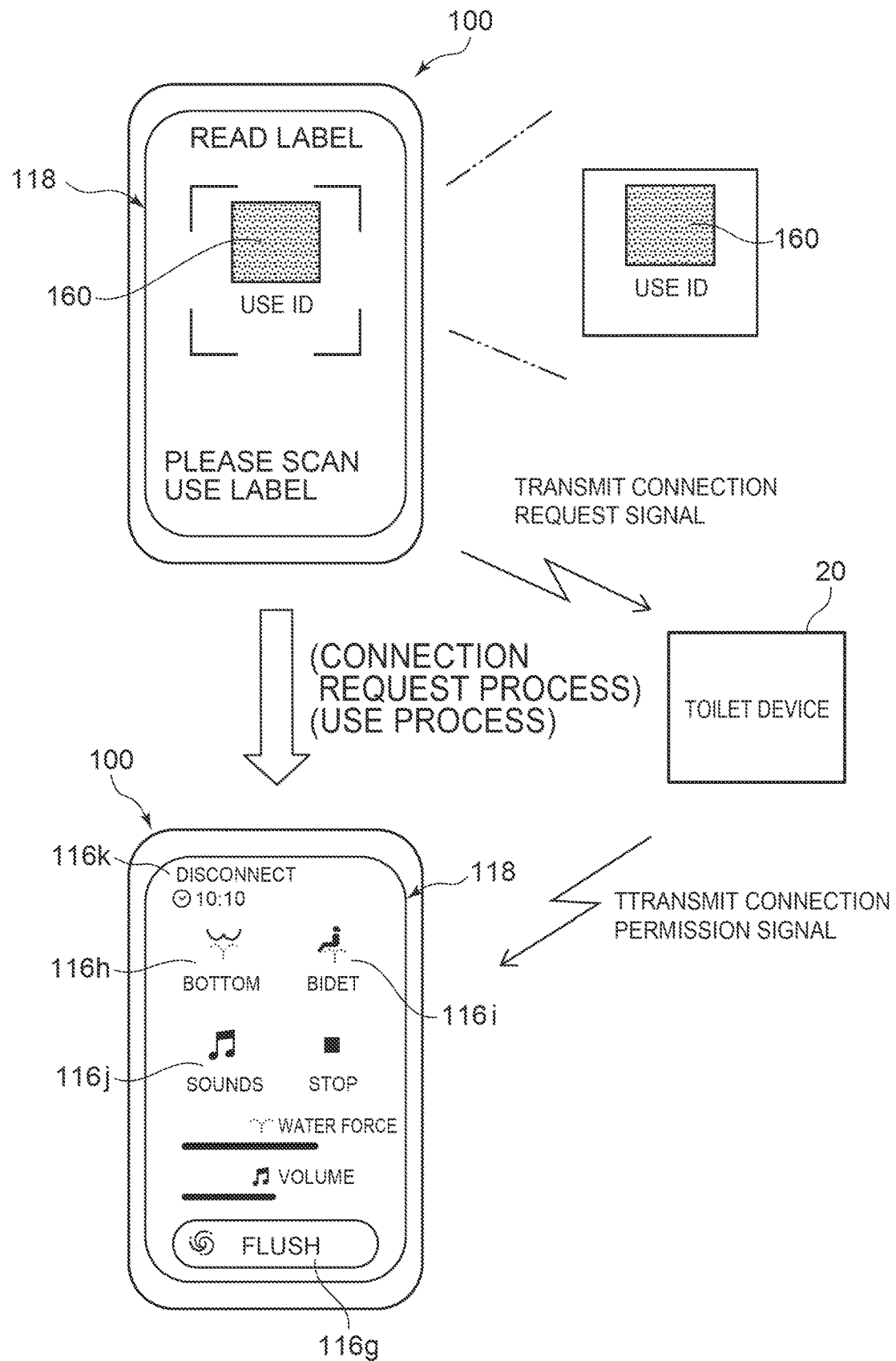
FIG. 9 is an explanatory drawing showing when a user that enters the toilet room operates the toilet device with the personal digital assistant.

FIG. 9 is an explanatory drawing showing when a user that enters the toilet room operates the toilet device with the personal digital assistant.

First, the user that enters the toilet room TR activates the program 200 (the application) of the remote operation stored in the storage part 112. Subsequently, as shown in FIG. 9, the use label 160 is read by the acquisition part 124 inside the application. Or, the user that enters the toilet room TR uses the acquisition part 124 to read the use label 160 as shown in FIG. 9. The program 200 (the application) of the remote operation stored in the storage part 112 is activated thereby. When the application is not installed in the personal digital assistant 100 of the user, the processing may proceed to an acquisition (download) process of the application via an Internet network when the personal digital assistant 100 reads the use label 160.

The program 200 of the application includes control processing of causing the wireless communication part 114 to automatically transmit the device identification information of the wireless communication part 114 and the second identification information when acquiring the use label 160. Accordingly, when acquiring the use label 160, the personal digital assistant 100 transmits a connection request signal including the second identification information stored in the use label 160. Namely, when reading the use label 160, the program 200 that is installed in the personal digital assistant 100 performs a connection request process of requesting a wireless connection by transmitting the connection request signal including the second identification information.

The controller 40 of the toilet device 20 compares the second identification information of the connection request signal transmitted from the personal digital assistant 100 and the second identification information stored in the storage part 42. Then, when both identification information match, the controller 40 establishes a wireless connection between the personal digital assistant 100 and the second wireless communication part 62.

In addition to the comparison of the second identification information, the controller 40 may compare the first identification information to determine whether or not to establish a wireless connection. Specifically, for example, the second identification information of the connection request signal transmitted from the personal digital assistant 100 and the second identification information stored in the storage part 42 are compared, and the personal digital assistant 100 and the controller 40 communicate when both identification information match. At this time, the controller 40 transmits the first identification information to the personal digital assistant 100. The personal digital assistant 100 transmits the first identification information received from the controller 40 back to the controller 40. The controller 40 determines whether or not the first identification information received from the personal digital assistant 100 matches the first identification information stored in the storage part 42. Then, when the first identification information matches, the controller 40 establishes the wireless connection between the personal digital assistant 100 and the second wireless communication part 62. In such a case, the personal digital assistant 100 may be configured to perform the comparison of the first identification information.

When the wireless connection is established, the controller 40 causes the second wireless communication part 62 to transmit a connection permission signal. The connection permission signal includes information related to the display settings stored in the storage part 42. As shown in FIG. 9, when receiving the connection permission signal, the controller 110 of the personal digital assistant 100 causes the display part 118 to display the operation button based on information related to the display setting. Namely, when receiving the connection permission signal transmitted from the second wireless communication part 62, the program 200 that is installed in the personal digital assistant 100 performs a use process of causing the display part 118 to display the operation buttons of the functional units of the toilet device 20.

For example, when the flush button 116g is operated, the controller 110 of the personal digital assistant 100 transmits a toilet flushing command signal. Based on the toilet flushing command signal, the controller 40 operates the toilet flush device 79 to flush the toilet 10. Thus, by operating the various operation buttons displayed by the display part 118, the user can operate the various functional units of the toilet device 20 with the user's personal digital assistant 100.

The user operates the disconnect button 116k to end the use of the toilet device 20. The wireless connection between the second wireless communication part 62 and the personal digital assistant 100 of the user is disconnected thereby (the wireless communication is disconnected). In such a case, when the wireless connection is disconnected, a notification (display) that the communication is disconnected may be provided to the personal digital assistant 100.

The disconnection of the wireless connection between the personal digital assistant 100 and the second wireless communication part 62 may be performed after a prescribed period has elapsed from the establishment of the wireless connection. In such a case, the elapse of the prescribed period may be timed by the personal digital assistant 100 or by the toilet device 20. Also, a pedometer of the personal digital assistant 100 and/or the radio wave strength between the personal digital assistant 100 and the second wireless communication part 62 may be utilized to disconnect the wireless connection when the user moves a prescribed distance away from the toilet room TR. As a result, the wireless connection between the personal digital assistant 100 and the second wireless communication part 62 can be prevented from undesirably continuing for a long period of time. Accordingly, for example, an unspecified number of users can utilize the toilet system 5 in the public restroom 1 or the like by using their own personal digital assistant 100.

Control processing between the setting mode and the personal digital assistant use mode performed by the controller 40 of the toilet device 20 will now be described.

Figure 10:
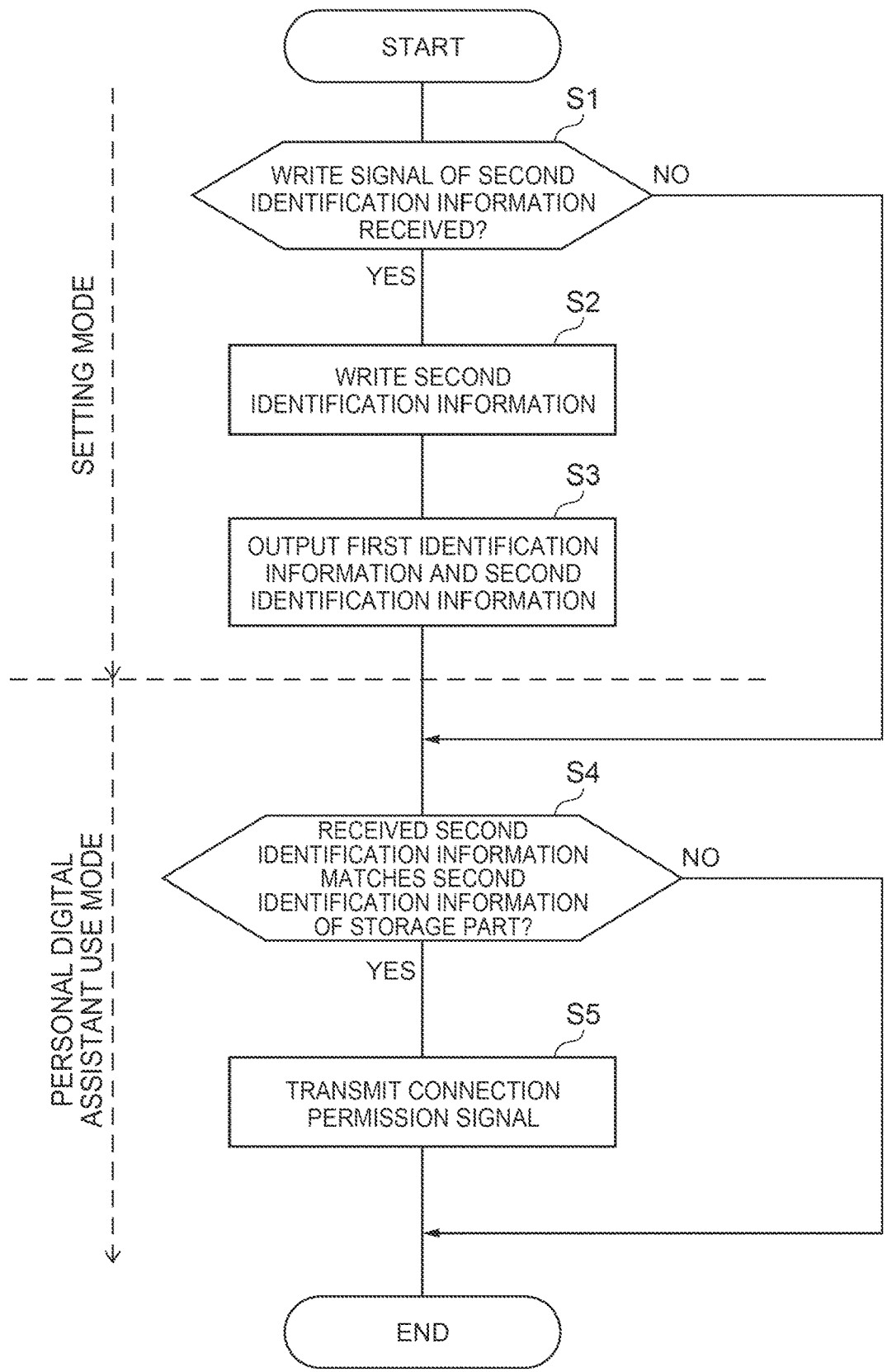
FIG. 10 is a flowchart showing the control between the setting mode and the personal digital assistant use mode performed by the controller of the toilet device.

FIG. 10 is a flowchart showing the control between the setting mode and the personal digital assistant use mode performed by the controller of the toilet device. The control processing shown in FIG. 10 is prestored in the storage part 42. The control processing shown in FIG. 10 is repeatedly performed at a prescribed period after the power supply of the toilet device 20 is switched on. Each step is illustrated by "S" in FIG. 10.

S1 to S3 in FIG. 10 are the setting mode in which the controller 40 associates the use label 160 and the second wireless communication part 62. S4 and S5 in FIG. 10 are the personal digital assistant use mode in which the second wireless communication part 62 and the personal digital assistant 100 of the user are wirelessly connected after the use label 160 and the second wireless communication part 62 are associated.

First, in S1, it is determined whether or not the write signal of the second identification information is received. Namely, the controller 40 determines whether or not the personal digital assistant 100 read the use label 160 after reading the setting label 150 and transmitted the write signal of the second identification information. When S1 is determined to be "YES", i.e., the write signal of the second identification information is received, the flow proceeds to S2. On the other hand, when S1 is determined to be "NO", i.e., the write signal of the second identification information is not received, the flow proceeds to S4.

In S2, the second identification information is written. Namely, the controller 40 writes (overwrites) the received second identification information in the storage part 42. As a result, the identification information of the second wireless communication part 62 includes the second identification information in addition to the first identification information. In other words, the controller 40 includes the setting mode of storing the second identification information when the write signal of the second identification information is received.

Then, in S3, the first identification information and the second identification information are output. Namely, the controller 40 causes the second wireless communication part 62 to output both identification information of the first and second identification information. As a result, the setting mode of setting the second identification information in the second wireless communication part 62 ends.

S4 and S5 are used when the manager performs a trial run or when the user uses the user's personal digital assistant 100. When performed by the user, "NO" in S1 proceeds to S4. On the other hand, when the manager is performing a trial run, S3 proceeds to S4.

In S4, it is determined whether or not the second identification information of the received connection request signal matches the second identification information stored in the storage part 42. Namely, the controller 40 monitors the reception of the second identification information written to the storage part 42 in S2. Then, when S4 is determined to be "YES", i.e., the controller 40 determines that the second identification information of the received connection request signal matches the second identification information stored in the storage part 42, the flow proceeds to S5. On the other hand, the processing ends when S4 is determined to be "NO", i.e., the controller 40 determines that the second identification information of the received connection request signal does not match the second identification information stored in the storage part 42. In other words, the controller 40 includes a personal digital assistant use mode of wirelessly connecting the second wireless communication part 62 and the personal digital assistant 100 when receiving the stored second identification information.

In S5, a connection permission signal is transmitted. In other words, when establishing the wireless connection between the personal digital assistant 100 and the second wireless communication part 62, the controller 40 transmits a connection permission signal toward the personal digital assistant 100 and ends the processing. The personal digital assistant 100 that receives the connection permission signal displays an operation screen in the display part 118. Subsequently, the controller 40 operates the functional units of the toilet device 20 based on the command signals transmitted from the connected personal digital assistant 100.

The toilet system 5 according to the embodiment includes: the toilet device 20 that includes the second wireless communication part 62 configured to communicate with the personal digital assistant 100, and the controller 40 controlling the second wireless communication part 62; the setting label 150 that stores the unique first identification information of the second wireless communication part 62 and is readable by the personal digital assistant 100; and the use label 160 that stores the modifiable second identification information of the second wireless communication part 62 and is readable by the personal digital assistant 100. When wirelessly connecting the second wireless communication part 62 and the personal digital assistant 100 based on the first identification information, the controller 40 stores the second identification information when receiving the second identification information transmitted from the personal digital assistant 100.

The first identification information of the second wireless communication part 62 is unique (unmodifiable). Accordingly, when the second wireless communication part 62 and the personal digital assistant 100 of the user are wirelessly connected using, for example, only the setting label 150, a corresponding setting label 150 must be prepared when the setting label 150 is damaged or lost. In other words, the functional units of the toilet device 20 cannot be operated with the personal digital assistant 100 until the setting label 150 is prepared. As a result, it is necessary to appropriately manage the second wireless communication part 62 and the setting label 150. Also, it may take time to prepare a new setting label 150. Accordingly, there is a risk that the toilet system 5 may not be easy to use.

Therefore, in addition to the first identification information, the toilet system 5 according to the embodiment uses the modifiable (overwritable) second identification information with the second wireless communication part 62. In the toilet system 5, the setting label 150 that stores the first identification information is for the manager; and the use label 160 that stores the second identification information is for the user. In other words, the use label 160 is highly versatile and can be used with multiple second wireless communication parts 62. As a result, the toilet system 5 can be used by using a new use label 160 even when, for example, the use label 160 is damaged or lost.

In addition to the first identification information, the toilet system 5 according to the embodiment uses the modifiable (overwritable) second identification information with the second wireless communication part 62. As a result, for example, even if the use label is intentionally lost due to mischievous purposes (e.g., a person other than the user wirelessly connecting using the use label and operating the functional units of the toilet device against the user's intentions, etc.), mischief can be suppressed because second identification information that is different from the original second identification information (the second identification information before being lost) can be provided in a new use label 160.

When receiving the stored second identification information, the controller 40 allows wireless connection between the second wireless communication part 62 and the personal digital assistant 100 that transmitted the second identification information. As a result, in the toilet system 5, the second wireless communication part 62 and the personal digital assistant 100 can wirelessly connect by using the modifiable second identification information. Accordingly, even when the use label 160 currently used becomes unusable, the toilet system 5 can be utilized promptly by using a new use label 160.

An example is described in the embodiment described above in which the controller 40 of the toilet device 20 determines whether or not to establish the wireless connection between the toilet device 20 (the second wireless communication part 62) and the personal digital assistant 100. However, as in modifications shown in FIGS. 11 and 12, the personal digital assistant 100 may perform the determination of establishing the wireless connection between the toilet device 20 (the second wireless communication part 62) and the personal digital assistant 100.

Figure 11:
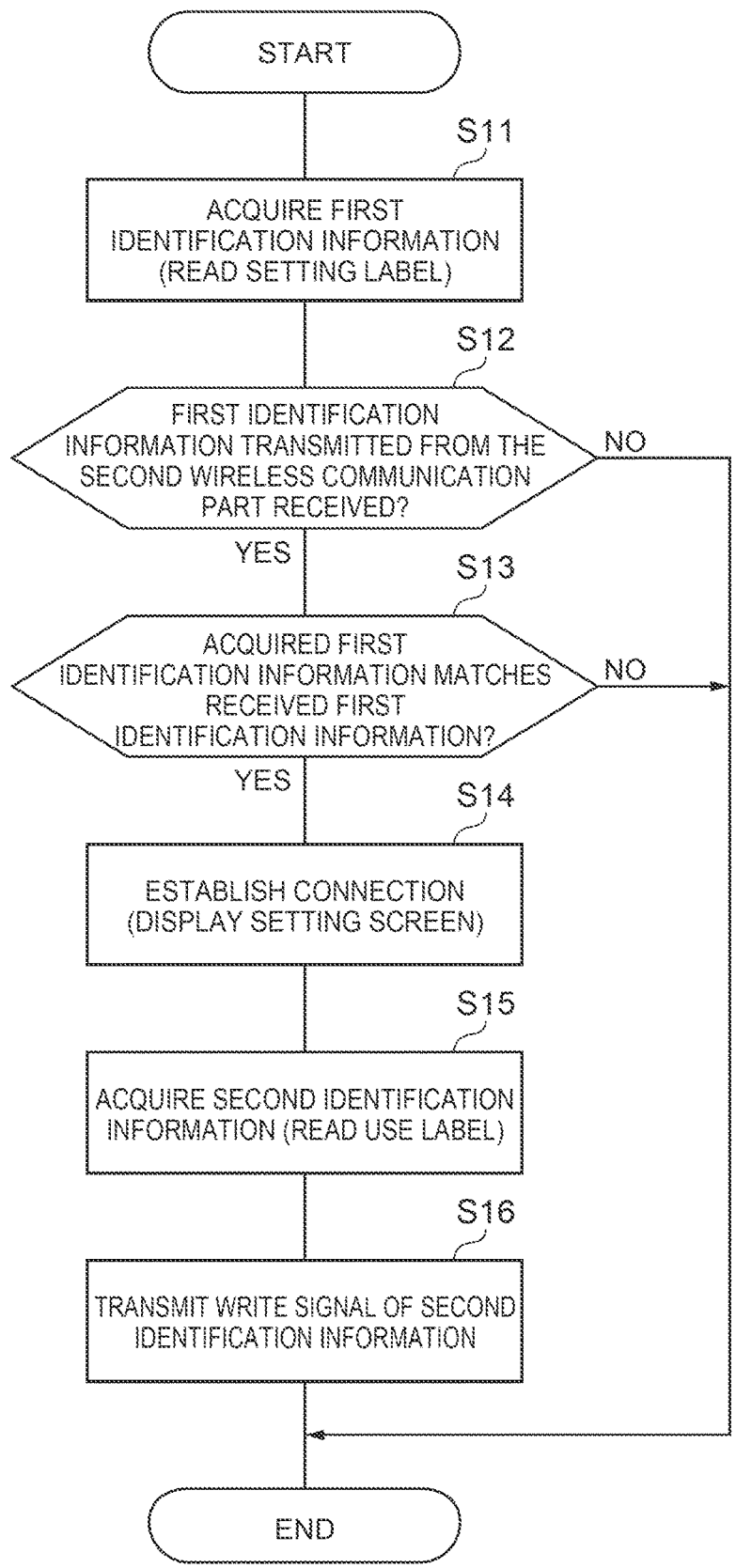
FIG. 11 is a flowchart showing write control of the second identification information performed by a controller of a personal digital assistant according to a modification.

FIG. 11 is a flowchart showing write control of the second identification information performed by a controller of a personal digital assistant according to a modification.

Figure 12:
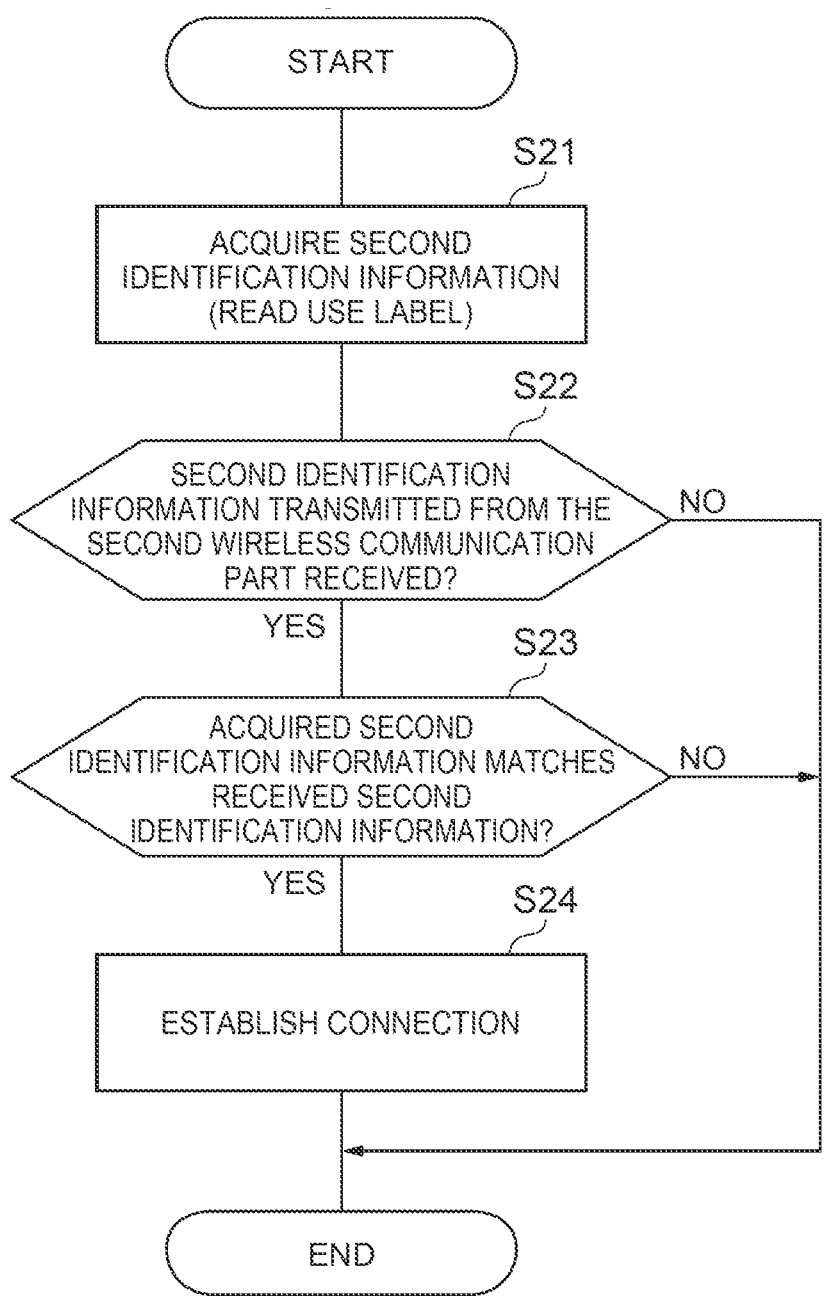
FIG. 12 is a flowchart showing connection establishment control performed by using the use label with a controller of a personal digital assistant according to a modification.

FIG. 12 is a flowchart showing connection establishment control performed by using the use label with a controller of a personal digital assistant according to a modification.

The control processing shown in FIGS. 11 and 12 is prestored in the storage part 112 of the personal digital assistant 100. The control processing shown in FIGS. 11 and 12 is repeatedly performed at a prescribed period. Each step is illustrated by "S" in FIGS. 11 and 12.

First, a case where the manager associates the use label 160 (the second identification information) with the toilet device 20 (the second wireless communication part 62) will be described with reference to FIG. 11.

The manager prepares the use label 160 and enters the toilet room TR. Then, the manager activates the program 200 (the application) of the remote operation stored in the storage part 112. The program 200 (the application) of the remote operation stored in the storage part 112 may be activated when the setting label 150 is read by the acquisition part 124 inside the application. When the application is not installed in the personal digital assistant 100, the processing may proceed to an acquisition (download) process of the application via an Internet network when the setting label 150 is read by the personal digital assistant 100.

In S11, the first identification information is acquired. In other words, the manager uses the acquisition part 124 of the personal digital assistant 100 to read the setting label 150 storing the first identification information. The controller 110 of the personal digital assistant 100 stores the acquired first identification information in the storage part 112.

Then, in S12, it is determined whether or not the first identification information transmitted from the second wireless communication part 62 is received. The second wireless communication part 62 continuously outputs (transmits) the first identification information after the power supply of the toilet device 20 is switched on. Accordingly, the first identification information is received when the personal digital assistant 100 comes within the detection range of the second wireless communication part 62.

Then, when S12 is determined to be "YES", i.e., the first identification information is received, the flow proceeds to S13. On the other hand, the processing ends when S12 is determined to be "NO", i.e., the first identification information is not received.

Then, in S13, it is determined whether or not the acquired first identification information matches the received first identification information. In other words, the controller 110 compares the first identification information stored in the storage part 112 and the received first identification information.

Then, when S13 is determined to be "YES", i.e., the acquired first identification information matches the received first identification information, the flow proceeds to S14. On the other hand, the processing ends when S13 is "NO", i.e., when the acquired first identification information does not match the received first identification information. The first identification information does not match when, for example, the first identification information of the second wireless communication part 62 mounted to another toilet room TR is received, etc. In S12 and S13, for example, the personal digital assistant 100 monitors the reception of the first identification information for a prescribed period after reading the setting label 150.

In S14, the wireless connection between the personal digital assistant 100 and the second wireless communication part 62 is established. In other words, when the received first identification information and the first identification information stored in the storage part 112 match, the controller 110 establishes the wireless connection between the personal digital assistant 100 and the second wireless communication part 62.

When the wireless connection with the second wireless communication part 62 is established, the controller 110 causes the display part 118 to display the setting screen (see FIG. 5). In other words, the program 200 that is installed in the personal digital assistant 100 performs the initial setting process of performing the initial setting of the toilet device 20 when the setting label 150 storing the unique first identification information of the second wireless communication part 62 is read into the personal digital assistant 100.

When the pairing setting button 116a of the initial setting process (the setting screen) is selected, the controller 110 causes the display part 118 to display the screen for reading the use label 160. In S15, the second identification information is acquired. Namely, the manager uses the acquisition part 124 of the personal digital assistant 100 to read the use label 160 storing the second identification information. The controller 110 of the personal digital assistant 100 stores the acquired second identification information in the storage part 112.

Then, in S16, the write signal of the second identification information is transmitted. The program 200 that is stored in the storage part 112 of the personal digital assistant 100 automatically transmits the write signal of the second identification information from the wireless communication part 114 when the use label 160 is acquired. Accordingly, when acquiring the use label 160, the personal digital assistant 100 transmits the second identification information stored in the use label 160.

In other words, the program 200 that is installed in the personal digital assistant 100 performs the pairing process of transmitting the write signal of the second identification information when the use label 160 storing the modifiable second identification information of the second wireless communication part 62 is read in the initial setting process.

The write signal of the second identification information is not limited to being automatically transmitted, and may be transmitted based on an operation of the manager. When the write signal of the second identification information is transmitted, the controller 110 returns the display part 118 to the setting screen and ends the processing.

The controller 40 of the toilet device 20 stores the received second identification information in the storage part 42. When storing different second identification information in the storage part 42, the second identification information is rewritten (overwritten) with the new second identification information. The use label 160 and the second wireless communication part 62 are paired (associated) thereby. When storing the second identification information, the second wireless communication part 62 sets both the first and second identification information as identification information of the second wireless communication part 62. Then, the second wireless communication part 62 continuously outputs the first and second identification information.

When storing the second identification information in the storage part 42, the controller 40 may transmit a pairing completion signal to the second wireless communication part 62. When receiving the pairing completion signal, for example, the controller 110 of the personal digital assistant 100 may cause the display part 118 to display "pairing setting between toilet device and use ID is complete" or the like. Then, the controller 110 of the personal digital assistant 100 may return the display part 118 to the setting screen according to an operation of the confirm button 116e.

A case where the user operates the functional units of the toilet device 20 with the user's personal digital assistant 100 will be described with reference to FIG. 12. Similar control processing to the trial run by the manager is performed.

First, the user that enters the toilet room TR activates the program 200 (the application) of the remote operation stored in the storage part 112. Or, the program 200 (the application) of the remote operation stored in the storage part 112 may be activated by the use label 160 being read by the acquisition part 124 inside the application. When the application is not installed in the personal digital assistant 100 of the user, the processing may proceed to an acquisition (download) process of the application via an Internet network when the use label 160 is read by the personal digital assistant 100.

In S21, the second identification information is acquired. In other words, the user uses the acquisition part 124 of the personal digital assistant 100 to read the use label 160 mounted to the wall surface of the toilet room TR, etc. The controller 110 of the personal digital assistant 100 stores the acquired second identification information in the storage part 112.

In S22, it is determined whether or not the second identification information transmitted (output) from the second wireless communication part 62 is received. When the second identification information has been associated with the toilet device 20 (the second wireless communication part 62) by the manager, the second wireless communication part 62 continuously outputs (transmits) the first and second identification information. Accordingly, the personal digital assistant 100 receives the second identification information when coming within the detection range of the second wireless communication part 62.

Then, when S22 is determined to be "YES", i.e., the second identification information is received, the flow proceeds to S23. On the other hand, the processing ends when S22 is determined to be "NO", i.e., the second identification information is not received.

Then, in S23, it is determined whether or not the acquired second identification information matches the received second identification information. Namely, the controller 110 compares the second identification information stored in the storage part 112 and the received second identification information.

Then, when S23 is determined to be "YES", i.e., the acquired second identification information matches the received second identification information, the flow proceeds to S24. On the other hand, the processing ends when S23 is "NO", i.e., the acquired second identification information does not match the received second identification information. The second identification information does not match when, for example, the second identification information of the second wireless communication part 62 mounted in another toilet room TR is received, when second identification information not associated with the toilet room TR is received, etc. In S22 and S23, for example, the personal digital assistant 100 monitors the reception of the second identification information for a prescribed period after reading the use label 160.

In S24, the wireless connection between the personal digital assistant 100 and the second wireless communication part 62 is established. Namely, the controller 110 performs a connection establishment process of establishing a connection with the second wireless communication part 62 when reading the use label 160 storing the modifiable second identification information of the second wireless communication part 62. Specifically, the controller 110 establishes the wireless connection between the personal digital assistant 100 and the second wireless communication part 62 when the received second identification information and the second identification information stored in the storage part 112 match.

In addition to the comparison of the second identification information, the controller 110 may determine whether or not to establish the wireless connection by comparing the first identification information. Specifically, for example, the personal digital assistant 100 and the controller 40 communicate when the received second identification information and the second identification information stored in the storage part 112 match. In such a case, the controller 40 transmits the first identification information and encrypted information of the first identification information to the personal digital assistant 100. The controller 110 encrypts the first identification information received from the controller 40 similarly to the controller 40 based on the first identification information received from the controller 40. Then, the controller 110 determines whether or not the encrypted information matches the encrypted information of the first identification information received from the controller 40. Then, when the first identification information matches, the controller 110 establishes the wireless connection between the personal digital assistant 100 and the second wireless communication part 62. In such a case, the controller 40 may be configured to perform the comparison of the first identification information.

When the wireless connection with the second wireless communication part 62 is established, the controller 110 causes the display part 118 to display the operation buttons for operating the functional units of the toilet device 20 (see FIG. 9). Namely, when the wireless connection with the second wireless communication part 62 is established, the program 200 that is installed in the personal digital assistant

100 performs a use process of causing the display part 118 to display the operation buttons of the functional units of the toilet device 20.

The operation buttons are displayed by the display part 118 in a form set by the manager by the display setting in the initial process. Accordingly, the controller 110 causes the display part 118 to display the operation buttons based on the display setting command signal transmitted from the second wireless communication part 62.

In such a case, the personal digital assistant 100 may receive command signals including information related to the display setting from the second wireless communication part 62 while the wireless connection n with the second wireless communication part 62 is established (in S23). By establishing the wireless communication connection between the personal digital assistant 100 and the second wireless communication part 62, a command signal that includes information related to the display setting may be transmitted from the second wireless communication part 62 and received by the personal digital assistant 100.

As a result, the user can operate various functional units of the toilet device 20 with the user's personal digital assistant 100. For example, when the flush button 116g is operated, a toilet flushing command signal is transmitted from the personal digital assistant 100. Based on the toilet flushing command signal, the controller 40 operates the toilet flush device 79 to flush the toilet 10.

An example is described in the embodiment described above in which the manager uses the setting label 150 to communicatably connect with the second wireless communication part 62 and perform the initial setting. However, the embodiment is not limited thereto; for example, the initial setting may be performed by connecting a personal digital assistant possessed by the manager to the toilet device with a wired connection. Also, the initial setting may be performed via an Internet network from a location (e.g., a control room, etc.) separated from the toilet room TR. In such cases, the setting label 150 that stores the first identification information is unnecessary.

An example is described in the embodiment described above in which the writing of the second identification information is performed by reading the setting label 150. However, the embodiment is not limited thereto; for example, an input operation may be performed using the personal digital assistant possessed by the manager.

The second identification information may include specific command information. For example, the second identification information may include command information that prohibits an operation of the functional units of the toilet device 20, command information that prohibits overwriting the second identification information except with specific second identification information, etc. As a result, for example, the manager can temporarily prohibit the utilization of the toilet system 5. Then, only a specific manager can reset the toilet system 5.

For example, the second identification information may include information for transitioning to an operation screen for senior citizens. As a result, for example, the user can select the operation screen with the user's personal digital assistant. The first identification information or the second identification information may be encrypted.

The processing of the various data described above may be recorded, as a program that can be executed by a processor of a personal digital assistant or a computer of a toilet device, in a magnetic disk (a flexible disk, a hard disk, etc.), an optical disk (CD-ROM, CD-R, CD-RW, DVD-ROM, DVD+R, DVD+RW, etc.), semiconductor memory, or other non-transitory computer-readable medium.

For example, the information that is recorded in the storage medium can be read by the computer (or an embedded system). The storage format (the recording format) of the storage medium is arbitrary. For example, a personal digital assistant or a computer of a toilet device reads a program from the storage medium and causes a CPU to execute the instructions recited in the program based on the program. In the computer, the acquisition (or the reading) of the program may be performed via a network.

Embodiments may include the following configurations.

Configuration 1

A toilet device, comprising:
a wireless communication part configured to communicate with a personal digital assistant; and
a controller configured to control the wireless communication part,
the wireless communication part including
first identification information that is unique, and
second identification information that is modifiable,
the controller storing the second identification information when receiving a write signal of the second identification information transmitted from the personal digital assistant.

Configuration 2

A toilet system, comprising:
a toilet device including
a wireless communication part configured to communicate with a personal digital assistant, the wireless communication part including
first identification information that is unique, and
second identification information that is modifiable, and
a controller configured to control the wireless communication part; and
a use label storing the second identification information, the use label being readable by the personal digital assistant,
when the wireless communication part and the personal digital assistant are communicatably connected based on the first identification information, the controller storing the second identification information when receiving the second identification information transmitted from the personal digital assistant.

Configuration 3

The toilet system according to Configuration 2, further comprising:
a setting label readable by the personal digital assistant, the first identification information being stored in the setting label.

Configuration 4

The toilet system according to Configuration 2 or 3, wherein
when receiving a connection request signal including the stored second identification information, the controller connects the wireless communication part and the personal digital assistant transmitting the connection request signal.

Configuration 5

The toilet system according to Configuration 2 or 3, wherein
a personal digital assistant of a user using the toilet device is configured to:
when reading the use label, store the second identification information stored in the use label; and
connect with the wireless communication part when the second identification information transmitted from the wireless communication part matches the second identification information stored in the personal digital assistant of the user.

Configuration 6

A method for setting a remote operation, the method being performed by a personal digital assistant configured to communicate with a wireless communication part of a toilet device, the method comprising:
an initial setting process of causing the personal digital assistant to perform an initial setting of the toilet device when reading a setting label,
first identification information of wireless the communication part being stored in the setting label,
the first identification information being unique.

Configuration 7

The method for setting the remote operation according to Configuration 6, further comprising:
a pairing process of causing the personal digital assistant to transmit a write signal of the second identification information when the personal digital assistant reads a use label storing second identification information of the wireless communication part in the initial setting process, the second identification information being modifiable.

Configuration 8

A method for setting a remote operation, the method being performed by a personal digital assistant configured to communicate with a wireless communication part of a toilet device, the method comprising:
a connection establishment process of causing the personal digital assistant to establish a connection with the wireless communication part when the personal digital assistant reads the use label storing second identification information of the wireless communication part, the second identification information being modifiable; and
a use process of causing the personal digital assistant to display an operation button of a functional unit of the toilet device in a display part when the connection with the wireless communication part is established.

Configuration 9

A non-transitory computer-readable storage medium, comprising:
program instructions stored in the non-transitory computer-readable storage medium,
the program instructions, when executed by a processor of the personal digital assistant according to Configuration 6, causing the personal digital assistant to perform the method according to Configuration 6.

Configuration 10

A non-transitory computer-readable storage medium, comprising:
program instructions stored in the non-transitory computer-readable storage medium,
the program instructions, when executed by a processor of the personal digital assistant, causing the personal digital assistant to perform the method according to Configuration 8.

Hereinabove, exemplary embodiments of the invention are described with reference to specific examples. However, the embodiments of the invention are not limited to these specific examples. Various modifications made by one skilled in the art in regard to the exemplary embodiments are within the scope of the invention to the extent that the purport of the invention is included. For example, the shapes, dimensions, materials, arrangements, etc., of the components included in the toilet device, the toilet system, the method for setting the remote operation, the non-transitory computer-readable storage medium, etc., are not limited to those illustrated, and can be modified as appropriate. Furthermore, any two or more components of the specific examples may be combined within the extent of technical feasibility, and are within the scope of the invention to the extent that the purport of the invention is included.

What is claimed is:

1. A toilet device, comprising:
a wireless communication part configured to communicate with a personal digital assistant; and
a controller configured to control the wireless communication part,
the wireless communication part including
first identification information that is unique, and
second identification information that is readable by the personal digital assistant and modifiable to identify the wireless communication part,
the controller storing the second identification information when receiving a write signal of the second identification information transmitted from the personal digital assistant.

2. A toilet system, comprising:
a toilet device including
a wireless communication part configured to communicate with a personal digital assistant, the wireless communication part including
first identification information that is unique, and
second identification information that is modifiable, and
a controller configured to control the wireless communication part; and
a use label storing the second identification information, the use label being readable by the personal digital assistant,
when the wireless communication part and the personal digital assistant are communicatably connected based on the first identification information, the controller storing the second identification information when receiving the second identification information transmitted from the personal digital assistant.

3. The system according to claim 2, further comprising:
a setting label readable by the personal digital assistant, the first identification information being stored in the setting label.

4. The system according to claim 2, wherein
when receiving a connection request signal including the stored second identification information, the controller connects the wireless communication part and the personal digital assistant transmitting the connection request signal.

5. The system according to claim 2, wherein
a personal digital assistant of a user using the toilet device is configured to:
when reading the use label, store the second identification information stored in the use label; and
connect with the wireless communication part when the second identification information transmitted from the wireless communication part matches the second identification information stored in the personal digital assistant of the user.

6. A method for setting a remote operation, the method being performed by a personal digital assistant configured to communicate with a wireless communication part of a toilet device, the method comprising:
an initial setting process of causing the personal digital assistant to perform an initial setting of the toilet device when reading a setting label,
first identification information of the wireless communication part being stored in the setting label,
the first identification information being unique, wherein the method further comprises:
a pairing process of causing the personal digital assistant to transmit a write signal of second identification information when the personal digital assistant reads a use label storing second identification information of the wireless communication part in the initial setting process, the second identification information being modifiable.

7. A method for setting a remote operation, the method being performed by a personal digital assistant configured to communicate with a wireless communication part of a toilet device, the method comprising:
a connection establishment process of causing the personal digital assistant to establish a connection with the wireless communication part when the personal digital assistant reads a use label storing second identification information of the wireless communication part, the second identification information being modifiable; and
a use process of causing the personal digital assistant to display an operation button of a functional unit of the toilet device in a display part when the connection with the wireless communication part is established.

8. A non-transitory computer-readable storage medium, comprising:
program instructions stored in the non-transitory computer-readable storage medium, the program instructions wirelessly connecting the personal digital assistant and the toilet device according to claim 1,
the program instructions, when executed by a processor of the personal digital assistant, causing the personal digital assistant to perform a method for setting a remote operation, the method being performed by a personal digital assistant configured to communicate with a wireless communication part of a toilet device, the method comprising:
an initial setting process of causing the personal digital assistant to perform an initial setting of the toilet device when reading a setting label,
first identification information of the wireless communication part being stored in the setting label,
the first identification information being unique, wherein the method further comprises:
a pairing process of causing the personal digital assistant to transmit a write signal of second identification information when the personal digital assistant reads a use label storing second identification information of the wireless communication part in the initial setting process, the second identification information being modifiable.

9. A non-transitory computer-readable storage medium, comprising:
program instructions stored in the non-transitory computer-readable storage medium, the program instructions wirelessly connecting the personal digital assistant and the toilet device according to claim 1,
the program instructions, when executed by a processor of the personal digital assistant, causing the personal digital assistant to perform a method for setting a remote operation, the method being performed by a personal digital assistant configured to communicate with a wireless communication part of a toilet device, the method comprising:
a connection establishment process of causing the personal digital assistant to establish a connection with the wireless communication part when the personal digital assistant reads a use label storing second identification information of the wireless communication part, the second identification information being modifiable; and
a use process of causing the personal digital assistant to display an operation button of a functional unit of the toilet device in a display part when the connection with the wireless communication part is established.

* * * * *

UNITED STATES PATENT AND TRADEMARK OFFICE
CERTIFICATE OF CORRECTION

| | | |
|---|---|---|
| PATENT NO. | : 12,361,234 B2 | Page 1 of 1 |
| APPLICATION NO. | : 18/596797 | |
| DATED | : July 15, 2025 | |
| INVENTOR(S) | : Shimpei Araki et al. | |

It is certified that error appears in the above-identified patent and that said Letters Patent is hereby corrected as shown below:

In the Specification

Column 23, Line 13, "wireless connection n with" should be --wireless connection with--

Column 25, Line 25, "of wireless the communication" should be --of the wireless communication--

Signed and Sealed this
Nineteenth Day of August, 2025

Coke Morgan Stewart
*Acting Director of the United States Patent and Trademark Office*